(12) United States Patent
Zhi et al.

(10) Patent No.: US 9,972,451 B2
(45) Date of Patent: May 15, 2018

(54) POLYELECTROLYTE AND A METHOD FOR MANUFACTURING AN ENERGY STORAGE DEVICE

(71) Applicant: City University of Hong Kong, Kowloon (HK)

(72) Inventors: Chunyi Zhi, Shatin (HK); Yan Huang, Skeh Kip Mei (HK)

(73) Assignee: City University of Hong Kong, Kowloon (HK)

( * ) Notice: Subject to any disclaimer, the term of this patent is extended or adjusted under 35 U.S.C. 154(b) by 170 days.

(21) Appl. No.: 14/953,924

(22) Filed: Nov. 30, 2015

(65) Prior Publication Data
US 2017/0154737 A1 Jun. 1, 2017

(51) Int. Cl.
*H01G 11/62* (2013.01)
*H01G 11/14* (2013.01)
(Continued)

(52) U.S. Cl.
CPC ............ *H01G 11/62* (2013.01); *H01G 11/14* (2013.01); *H01G 11/36* (2013.01); *H01G 11/48* (2013.01);
(Continued)

(58) Field of Classification Search
CPC ........ H01G 11/04; H01G 11/28; H01G 11/32; H01G 11/42; H01G 11/64; H01G 11/66
See application file for complete search history.

(56) References Cited

U.S. PATENT DOCUMENTS 6,602,976 B2 * 8/2003 Smith ................ C08G 64/0208
428/402
7,347,954 B2 * 3/2008 Banno ................... C07C 219/08
252/62.2

(Continued)

FOREIGN PATENT DOCUMENTS

CN 103400702 A 11/2013
KR 101476988 B1 12/2014

OTHER PUBLICATIONS

Sun, J.Y.; Highly stretchable and tough hydrogels. Nature 489, 133-136, doi: 10.1038/nature11409 (2012).
(Continued)

*Primary Examiner* — Nguyen Ha
(74) *Attorney, Agent, or Firm* — Renner Kenner Greive Bobak Taylor & Weber

(57) ABSTRACT

A new multifunctional polyelectrolyte, particularly suitable for a solid-state supercapacitor, is obtainable or obtained by reacting an effective amount of vinyl hybrid silica nanoparticles (VSNPs) and a compound having a structural unit based on acrylic acid or a structural unit derived therefrom in the presence of a polymerization initiator. The polyelectrolyte allows for an advantageous tunable ionic conductivity, exceptional self-healability and super-stretchability. An energy storage device, in particular a solid-state supercapacitor, includes the polyelectrolyte. A method for manufacturing a solid-state supercapacitor as well as for repairing a solid-state supercapacitor having cracks is also disclosed. Benefiting from the superior properties of the polyelectrolyte, the energy storage devices based thereon exhibit highly advantageous stretchability and self-healability and an exceptional performance compared to conventionally known devices.

6 Claims, 22 Drawing Sheets

(51) Int. Cl.
*H01G 11/36* (2013.01)
*H01G 11/48* (2013.01)
*H01G 11/60* (2013.01)
*H01G 11/86* (2013.01)
*H01G 11/56* (2013.01)
*H01G 11/84* (2013.01)

(52) U.S. Cl.
CPC .............. *H01G 11/56* (2013.01); *H01G 11/60* (2013.01); *H01G 11/84* (2013.01); *H01G 11/86* (2013.01); *Y02E 60/13* (2013.01)

(56) References Cited

U.S. PATENT DOCUMENTS

| | | | |
|---|---|---|---|
| 8,052,888 B2 * | 11/2011 | Yoshino | C08G 67/02 252/62.2 |
| 9,381,471 B2 * | 7/2016 | Penicaud | A61L 27/443 |
| 2001/0012591 A1 * | 8/2001 | Michot | C07C 311/48 429/339 |
| 2015/0183897 A1 * | 7/2015 | Chao | H01G 9/028 252/62.2 |

OTHER PUBLICATIONS

Cordier, P.; Self-healing and thermoreversible rubber from supramolecular assembly. Nature 451 ,977-980, doi: 10.1 038/ nature06669 (2008).

* cited by examiner

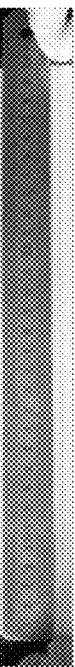
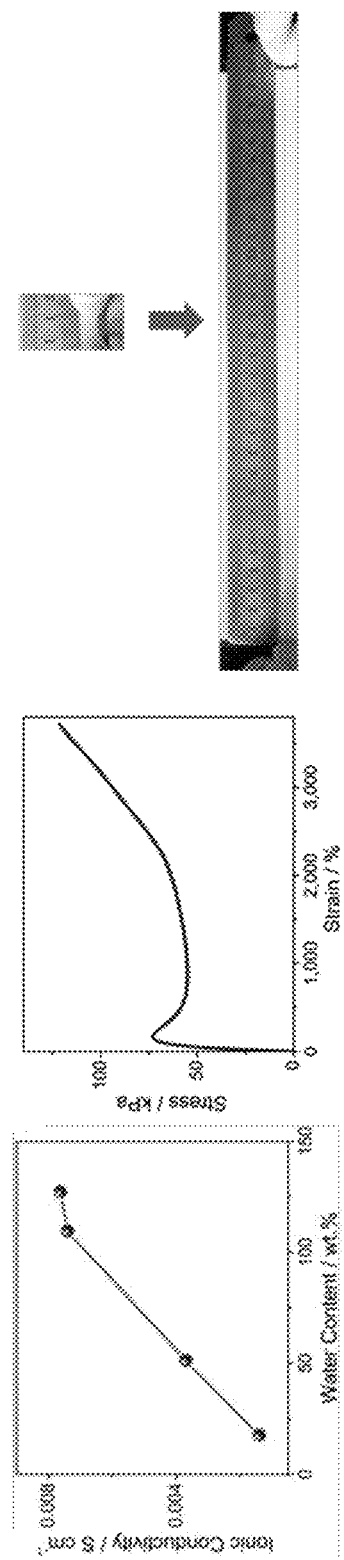
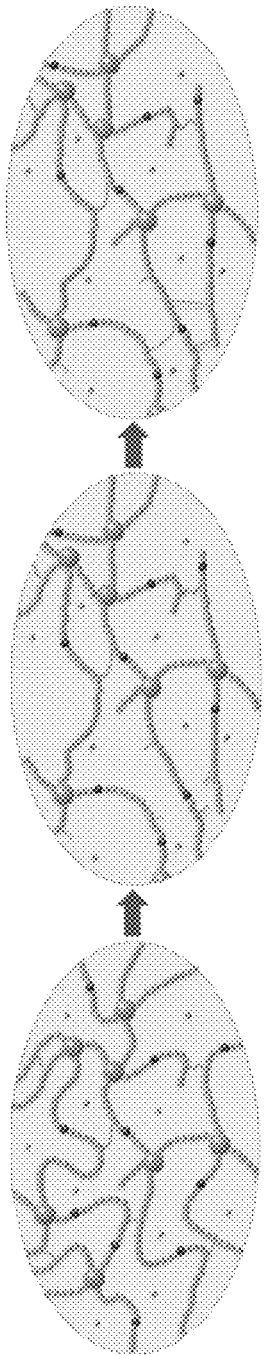

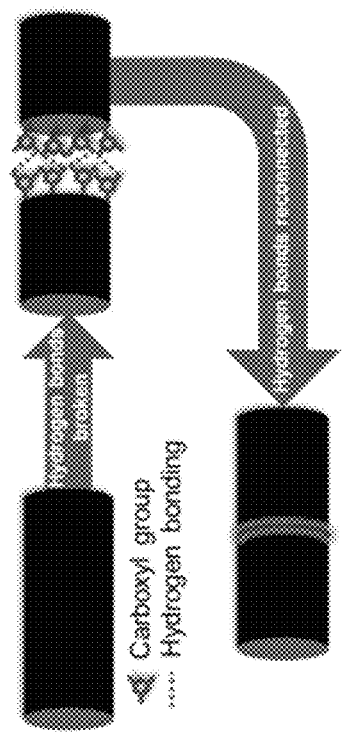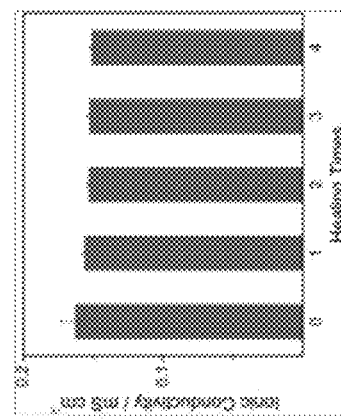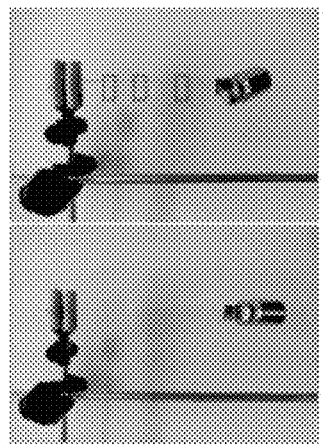

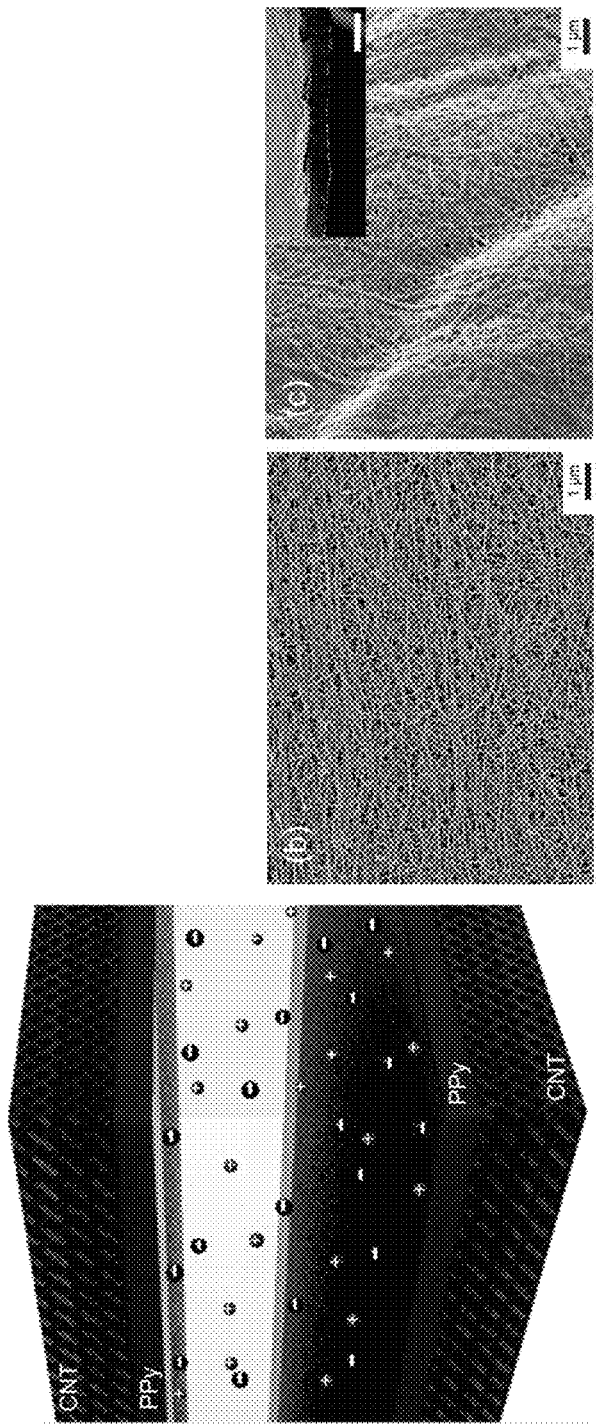

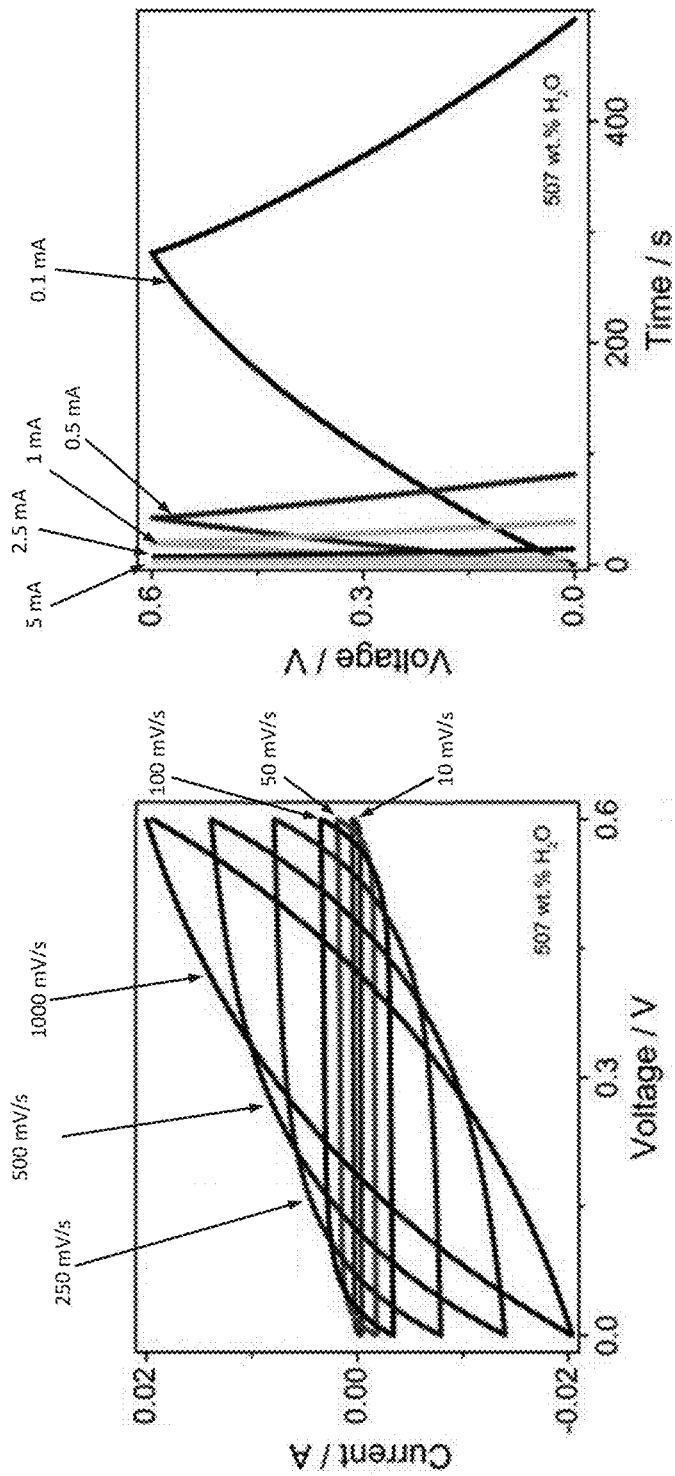

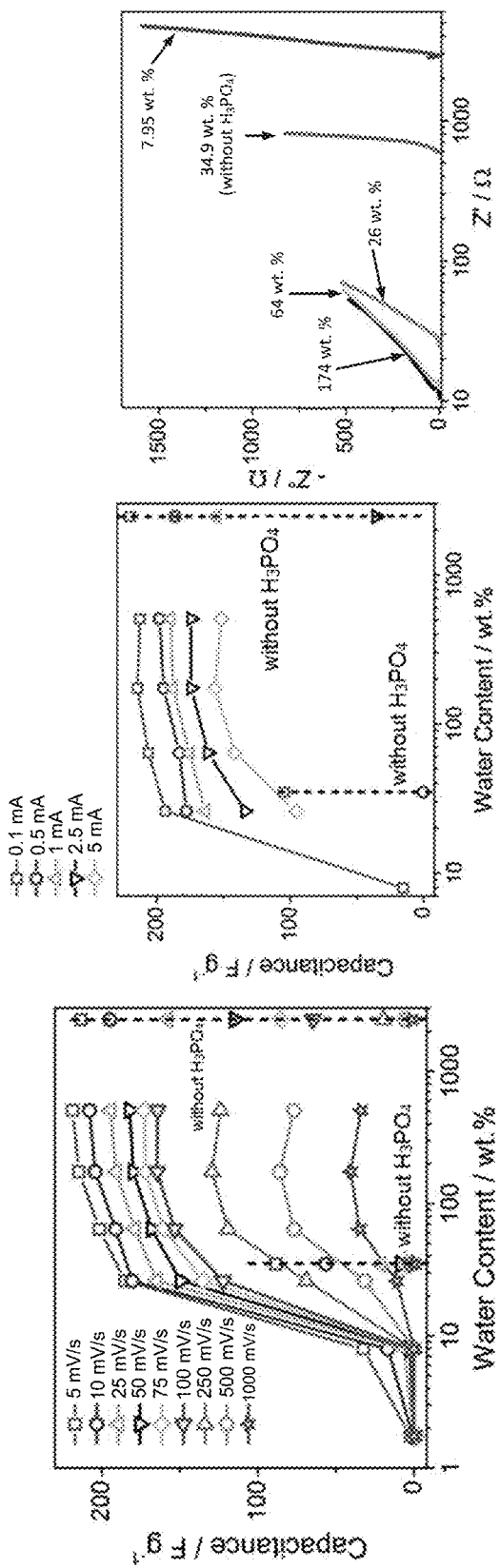

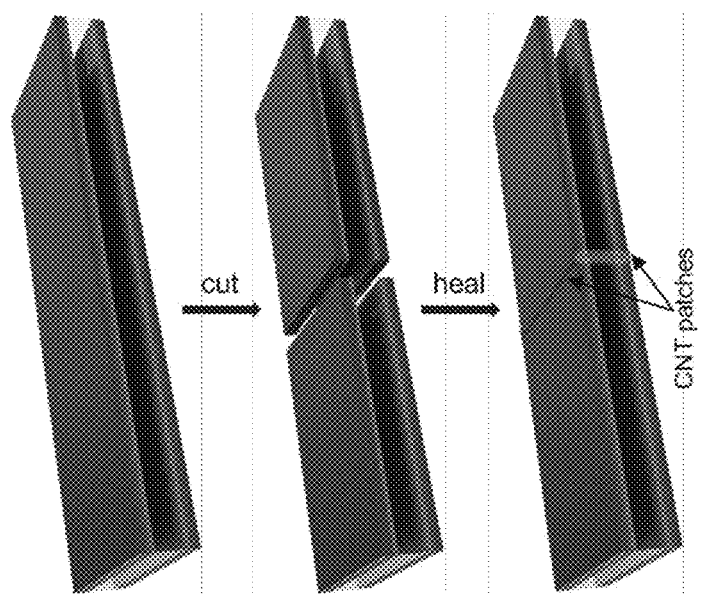

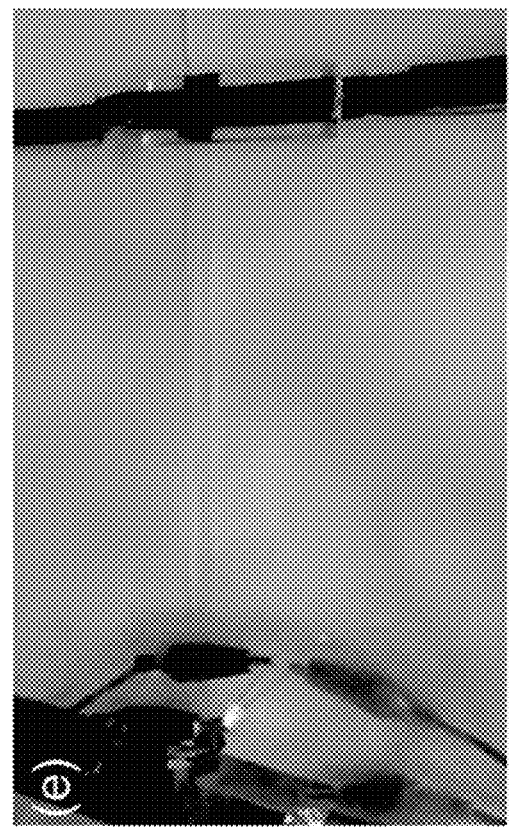
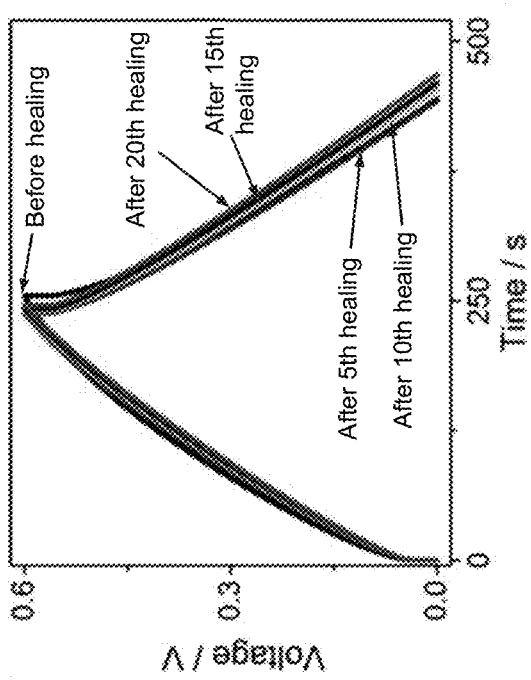
Fig. 4(d)
Fig. 4(e)

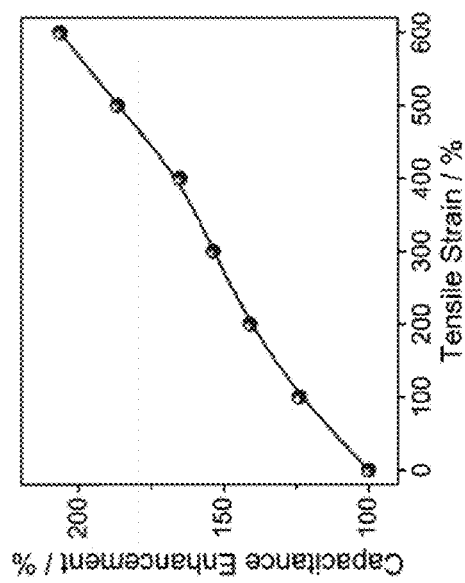
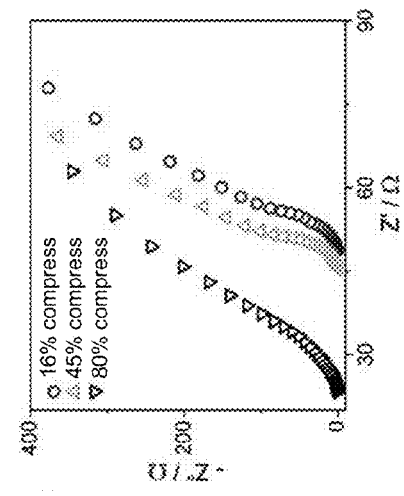
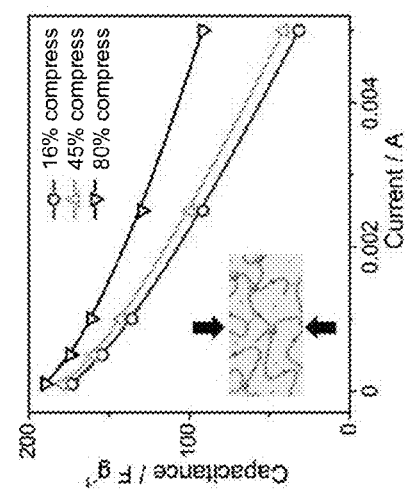
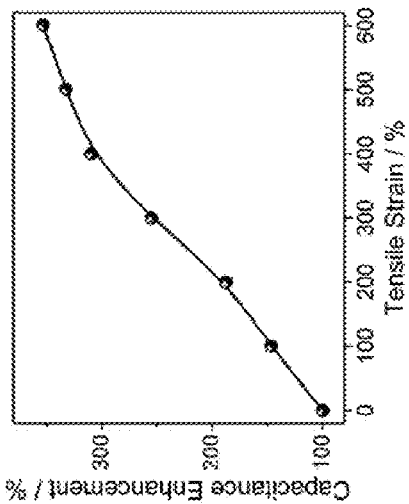

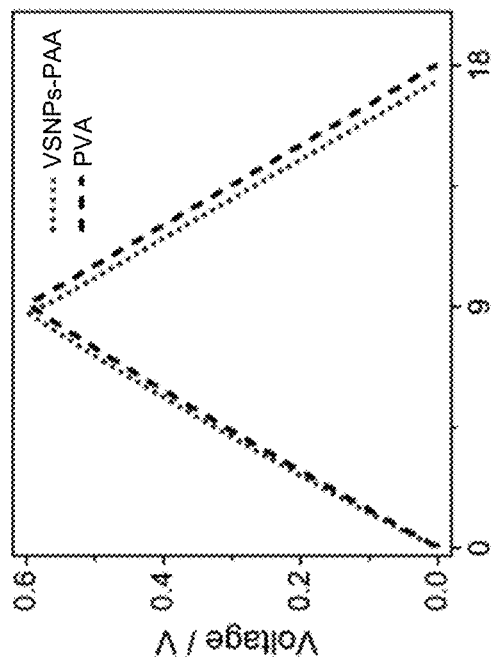
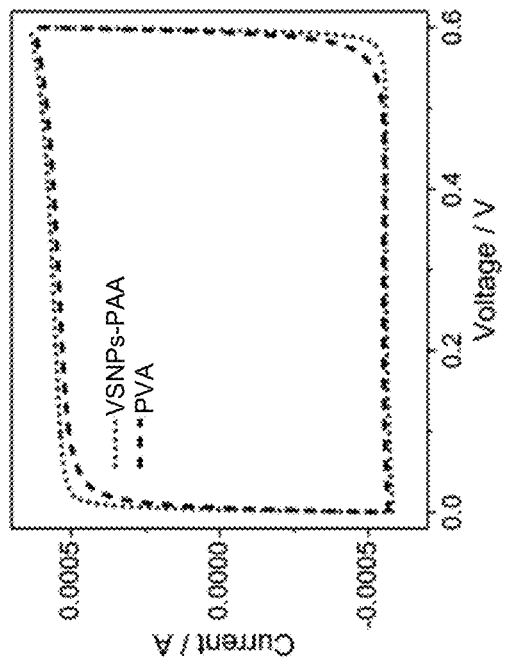
Fig. 9(a)
Fig. 9(b)

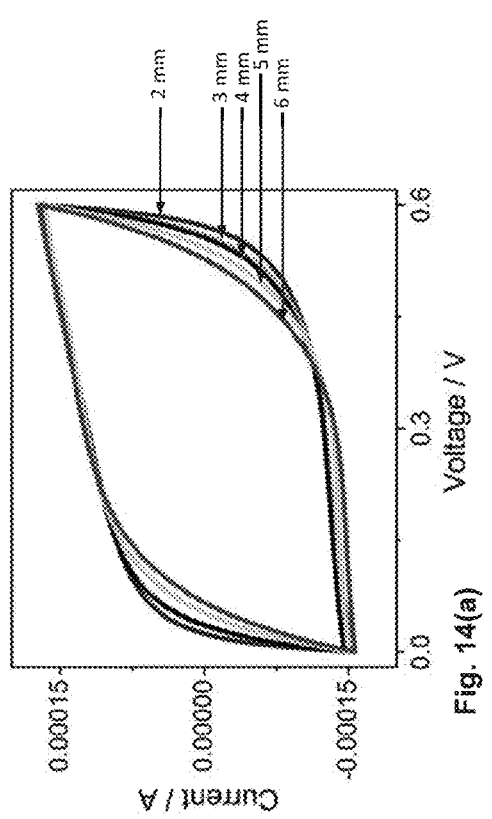
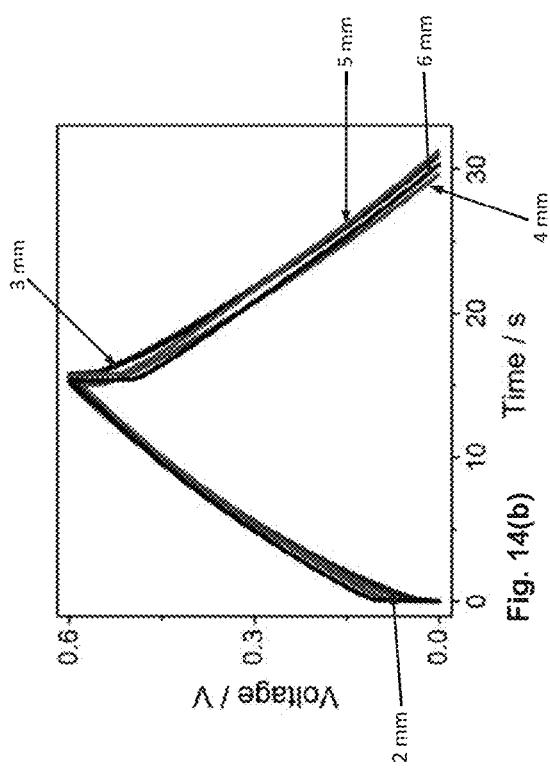

POLYELECTROLYTE AND A METHOD FOR MANUFACTURING AN ENERGY STORAGE DEVICE

TECHNICAL FIELD

The present invention provides a new multifunctional polyelectrolyte, in particular a polyelectrolyte which is suitable for a solid-state supercapacitor, as well as a method for its preparation. The present invention further refers to a polymerizable composition useful in forming said polyelectrolyte. Further described is an energy storage device, in particular a solid-state supercapacitor, comprising said polyelectrolyte and a method for manufacturing a solid-state supercapacitor as well as repairing it.

BACKGROUND OF THE INVENTION

Super-stretchability and self-healability are generally desirable features of materials, in particular of materials in energy storage devices. However, only few materials, if any, are generally able to provide both, high stretchability and high self-healability. Materials described so far for being stretchable or self-healable include, for example, the stretchable polymer based on ionic and covalent crosslinks of crosslinked alginate and polyacrylamide described in Sun et al. as well as a self-healable material formed from amido-ethylimidazoline, di (aminoethyl) urea and diamino tetraethyl triurea mentioned in Cordier et al. (Sun et al., Nature, 2012, 489:133-136 and Cordier et al., Nature, 2008, 451, doi:10.1038/nature06669). Despite this, just a different challenge is to provide materials which are also suitable to act as indispensable electrolyte in energy storage devices such as in solid-state supercapacitors, i.e. which are suitable to act as materials allowing for self-healability and stretchability of the device and as electrolyte at the same time.

The healing properties and stretchability of solid-state supercapacitors provided so far are fundamentally limited despite the fact that it is a challenge to address both self-healability and stretchability at the same time as already explained. Besides, the self-healability or stretchability usually obtained is not sufficient for many purposes. However, the design of both highly self-healable and super-stretchable devices is a crucial feature allowing new and unprecedented applications on the one hand and especially portable and wearable supercapacitors, coupled with either self- or stretchability, on the other hand are particularly needed for personalized electronics because of their high power density, fast rate of charge-discharge and long cycling lifetime as well as the aforementioned functions.

Up to now, self-mending polymeric materials or external stimuli such as heat and light have been employed for the mechanical recovery and electrical restoration of devices. In devices reported so far, usually an indispensable layer of electrolyte between two electrodes in addition to an extra layer of self-healing polymer has been applied to the electrodes or used as a substrate for the self-healable supercapacitors. However, a key disadvantage of these self-healable supercapacitors is the low healing efficiency and cyclability. After merely few times of breaking and healing, the performance of these capacitors is usually reduced by at least 10%. Another highly desirable feature missing in these devices is a suitable and convenient volume/mass economy due to the use of an additional component as well as a resulting more complicated and expensive production process.

Further approaches addressing stretchability relate to modified structures (e.g., non-coplanar buckled structures, serpentine and wavy structures, percolating nanostructured films) and electron-/ion-inactive stretchable substrates (such as elastomers and stretchable textiles) in order to introduce stretchability into conventionally rigid supercapacitors such as in CN103400702 or KR101476988. However, the stretchability of respective devices which can be achieved is usually far less than 100%.

All the limitations mentioned above are fundamentally attributed to the fact that the polyvinyl alcohol (PVA)-based acidic electrolytes widely used in solid-state supercapacitors are neither healable nor sufficiently stretchable with the consequence of an unsatisfactory performance, the need for additional components and a highly complex multi-step preparation and construction of suitable devices.

Accordingly, there exists a strong need for multifunctional electrolytes such as for energy storage devices, which electrolytes are self-healable and highly stretchable, amongst others. There is especially a need for electrolytes suitable for solid-state supercapacitors with suitable ionic conductivity which at the same time ensure a sufficient self-healability and stretchability of those devices to allow for the highly demanded further applications.

SUMMARY OF THE INVENTION

The present invention provides a method for preparing a polyelectrolyte by reacting an effective amount of each of the following compounds to link said compounds:

A compound a) being a vinyl hybrid silica nanoparticle (VSNP); in particular VSNPs with an average diameter of less than 10 nm;

A compound b) containing a structural unit based on acrylic acid or a structural unit derived therefrom, namely a structural unit of Formula (I) or a structural unit derived therefrom:

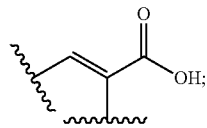

Formula (I)

in particular a compound b) which is an acrylic acid monomer of Formula (II)

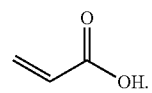

Formula (II)

The reaction is carried out in the presence of a polymerization initiator. Said method of the present invention comprises the steps of:

a) Providing an aqueous dispersion of the compound a);
b) Adding both, the compound b) and the polymerization initiator, in particular ammonium persulfate, to the dispersion obtained in step a) and stirring at a temperature of less than 10° C.;
c) Performing the polymerization at a temperature above 20° C.;
d) Optionally soaking the polymer obtained from step c) in phosphoric acid with a concentration of up to 70 wt.-%.

The invention further provides a polyelectrolyte obtainable and obtained, respectively, by said method, in particular a polyelectrolyte suitable for a supercapacitor, in particular a solid-state supercapacitor.

Additionally, a polyelectrolyte is provided by the present invention which comprises and in particular consists of:
Structural units of the Formula (III)

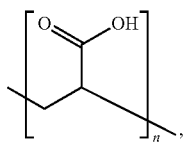

Formula (III)

in which n is an integer of at least 2;
vinyl hybrid silica nanoparticles (VSNPs);
optionally phosphoric acid and protons derived from phosphoric acid, respectively; and
optionally water, usually non-ionic water, in particular de-ionized water.

In still another aspect, the present invention refers to a polymerizable composition useful in forming a polyelectrolyte, comprising compound a), compound b) and ammonium persulfate as well as to a method for producing a polyelectrolyte from said polymerizable composition. Said method comprises the steps of:
a) Stirring the polymerizable composition at a temperature of less than 10° C.;
b) Performing the polymerization at a temperature above 20° C.; and
c) Optionally soaking the polymer obtained from step b) in phosphoric acid with a concentration of up to 70 wt.-%.

The prepared polyelectrolyte allows for an advantageous tunable ionic conductivity, excellent self-healability triggered by the formation of extensive carboxyl-mediated interfacial hydrogen bonds and super-stretchability. Said polyelectrolyte can be stretched over 36-fold without any visible crack, which is much higher than the stretchability of usual highly stretchable polymers, suggesting an effective strengthening mechanism of reversible crosslinking interactions through stress transfer and energy dissipation.

Once cut, the polyelectrolyte of the present invention can be simply repaired by just bringing together the broken interfaces to self-heal at ambient conditions, namely at room temperature and mild pressure and the repaired sample still shows excellent ionic properties similar to pristine samples after several times of breaking and healing, suggesting a complete self-healing.

These advantageous properties of the polyelectrolyte of the present invention in particular arise from the specific polymeric network structure, especially from the VSNPs-aided toughening and the additional hydrogen bonding crosslinking. Namely, polymerized chains of compound b) are double cross-linked by hydrogen bonding as well as by VSNPs, which allows for highly advantageous properties of the resulting polyelectrolyte.

Hence, the present invention provides a highly promising polyelectrolyte which can be highly advantageous and promising when producing multifunctional devices such as super-stretchable energy storage device and/or self-healable energy storage devices in many fields like energy storage and bio-mimic sensing, in particular portable and wearable multifunctional devices with extreme self-healability and stretchability.

In still another aspect of the invention, the invention provides an energy storage device comprising a polyelectrolyte of the present invention, in particular a solid-state supercapacitor further comprising two polypyrrole-deposited carbon nanotube paper electrodes.

Still further, the invention refers to a method for manufacturing a solid-state supercapacitor. Said method comprises the steps of placing two polypyrrole-deposited carbon nanotube paper electrodes on each side of a film of the polyelectrolyte of the present invention.

Still further provided by the invention is a method of repairing a solid-state supercapacitor having two polypyrrole-deposited carbon nanotube paper electrodes and a polyelectrolyte of the invention, which solid-state supercapacitor further has at least one crack present at the outer supercapacitor surface ("outer crack area") at least proceeding through the polypyrrole-deposited carbon nanotube paper electrode into the polyelectrolyte. Said method comprises paving at least one carbon nanotube paper patch on said outer crack area such that said outer crack area is at least partially and in particular completely covered by the carbon nanotube paper patch.

Said energy storage devices, in particular solid-state supercapacitors, based on the polyelectrolyte of the present invention exhibit exceptional properties. They can be self-healed without any assistance of additional self-healable materials and the healing efficiency keeps about 100% even after several cycles of breaking and healing.

The solid-state supercapacitors of the present invention are very efficiently and facilely assembled without compromising the capacitance by the use of the new polyelectrolyte and polypyrrole-deposited carbon nanotube paper electrodes. Namely, the fabrication of said self-healable supercapacitors usually takes a few minutes without the need for additional components such as binders or a separator. Incorporated with a simple pre-stretched wavy structure allowing for an enhanced performance and optionally small carbon nanotube patches on possible outer crack areas, these supercapacitors provide superior multifunctionality, tunable performance, super-stretchability and excellent self-healability.

In this context, especially, the specific pre-stretched structure and the use of highly flexible polypyrrole-deposited carbon nanotube paper electrodes contribute to the exceptional specific capacitances even under super strains which are highly attractive for high performance super-stretchable devices. Unlike commonly used rigid supercapacitors, the inventive design of a highly flexible system realizes multiple functions in one single device which can be produced easily, with only few steps and reduced effort.

BRIEF DESCRIPTION OF THE DRAWINGS

FIG. 1(a) exemplarily shows the preparation of VSNPs from vinyl-triethoxysilane.

FIGS. 2(a) to 2(h) relate to certain physicochemical properties of a VSNPs-PAA polyelectrolyte. FIG. 2(a) is a diagram showing the ionic conductivity of a VSNPs-PAA polyelectrolyte as a function of the water content in wt.-%, i.e. the weight of water relative to the weight of PAA in the polyelectrolyte. FIG. 2(b) shows a stress-strain curve of VSNPs-PAA under stretch with a water content of 150 wt.-% in the polyelectrolyte, i.e. the weight of water in the polyelectrolyte relative to the weight of PAA in the polyelectrolyte. FIG. 2(c) shows a relaxed (top) and elongated (down) state of the VSNPs-PAA. FIG. 2(d) is a schematic representation providing further explanation for the super-stretchability of the polyelectrolyte of the present invention. FIG. 2(e) is a picture demonstrating the self-healing process of a VSNPs-PAA of the present invention. FIG. 2(f) is a picture demonstrating the self-healing of a VSNPs-PAA polyelectrolyte of the present invention (3.4 mm thick and 1.8 cm wide) to completely support ca. 500 g mass, which equates to 80 kPa of stress before healing (left) and after the $3^{rd}$ breaking/healing cycle (right). Red rectangles indicate the wound/healing positions. FIG. 2(g) is a diagram showing the ionic conductivity of a VSNPs-PAA polyelectrolyte of the present invention after multiple breaking/healing cycles. FIG. 2(h) is a schematic representation of self-healing of a polyelectrolyte of the present invention arising from interfacial hydrogen bonding.

FIGS. 3(a) to 3(h) refer to the electrochemical performance of a VSNPs-PAA polyelectrolyte of the present invention. FIG. 3(a) is a schematic representation of a solid-state supercapacitor of the present invention comprising VSNPs-PAA polyelectrolyte between two PPy-CNT paper electrodes. FIG. 3(b) is a SEM image of the CNT paper. FIG. 3(c) is a SEM image of PPy electrodeposited on CNT paper (Inset is a cross-sectional SEM image of the PPy electrodeposited on CNT paper. Scale bar: 50 μm). FIG. 3(d) shows CV curves at various scan rates from 10 mV/s to 1000 mV/s. FIG. 3(e) shows GCD curves at various charging/discharging currents from 0.1 mA to 5 mA. FIG. 3(f) shows graphs of the specific capacitance depending on the water content and presence of phosphoric acid under various scan rates. FIG. 3(g) shows graphs of the specific capacitance depending on the water content and presence of phosphoric acid under various charging/discharging currents. FIG. 3(h) shows Nyquist plots of an assembled supercapacitor with various water contents.

FIGS. 4(a) to 4(e) illustrate the self-healing performance of the solid-state supercapacitor comprising a VSNPs-PAA polyelectrolyte. FIG. 4(a) is a schematic representation of a modification of the outer surface of a supercapacitor and of a method for repairing a supercapacitor, respectively, by attaching CNT paper patches to outer crack areas, i.e. of a patch-assisted self-healing of the supercapacitor. FIG. 4(b) shows CV curves after multiple breaking/healing cycles at a scan rate of 5 mV/s. FIG. 4(c) shows the healing efficiencies after multiple breaking/healing cycles calculated from CV (circle) and GCD (pentagon/star) curves. FIG. 4(d) shows GCD curves after multiple breaking/healing cycles at a charging/discharging current of 1 mA. FIG. 4(e) is a photo of three supercapacitors connected in series to successfully power a LED bulb after self-healing.

FIGS. 5(a) to 5(h) refer to the electrochemical performance of a solid-state supercapacitor comprising a VSNPs-PAA polyelectrolyte under super-stretch and compress. FIG. 5(a) is a schematic representation of the fabrication of a super-stretchable solid-state supercapacitor of the present invention. FIG. 5(b) shows a SEM image of the released PPy-CNT paper electrode after pre-stretch. FIG. 5(c) shows CV curves under various tensile strains from 0% to 600% at a scan rate of 0.1 V/s. FIG. 5(d) shows GCD curves under various tensile strains from 0% to 600% at a charging/discharging current of 2.5 mA. FIG. 5(e) is a graph referring to the capacitance enhancement ratio obtained from CV curves as a function of the tensile strain. FIG. 5(f) is a graph showing the capacitance enhancement ratio obtained from GCD curves as a function of the tensile strain. FIG. 5(g) shows graphs of the specific capacitance as a function of the charging/discharging current under various compressive strains (inset illustrates the direction of pressure applied). FIG. 5(h) shows Nyquist plots of the supercapacitor under various compressive strains.

FIGS. 9(a) and 9(b) show CV and GCD curves, respectively, using VSNPs-PAA (dotted) and PVA (dashed) as the electrolyte with the same mass ratio (polymer:$H_3PO_4$:$H_2O$). FIG. 9(a) shows a CV curve using VSNPs-PAA (dotted) and PVA (dashed) as the solid state electrolyte with the same mass ratio (polymer:$H_3PO_4$:$H_2O$). FIG. 9(b) shows GCD curves using VSNPs-PAA (dotted) and PVA (dashed) as the solid state electrolytes with the same mass ratio (polymer:$H_3PO_4$:$H_2O$).

FIG. 11(a) shows CV curves of the supercapacitor without a patch before (solid) and after (dotted) the $1^{st}$ breaking/healing cycle at scan rate of 10 and 5 mV/s, respectively. FIG. 11(b) shows GCD curves of the supercapacitor without a patch before (solid) and after (dotted) the $1^{st}$ breaking/healing cycle at a charge/discharge current of 1 and 0.5 mA, respectively.

FIGS. 14(a) and 14(b) show comparative CV and GCD curves, respectively, of a supercapacitor with various thicknesses of the VSNPs-PAA polyelectrolyte. FIG. 14(a) shows CV curves of a supercapacitor with various thicknesses of the VSNPs-PAA electrolyte. FIG. 14(b) shows GCD curves of a supercapacitor with various thicknesses of the VSNPs-PAA polyelectrolyte.

DESCRIPTION OF THE EMBODIMENTS

Figure 1A:
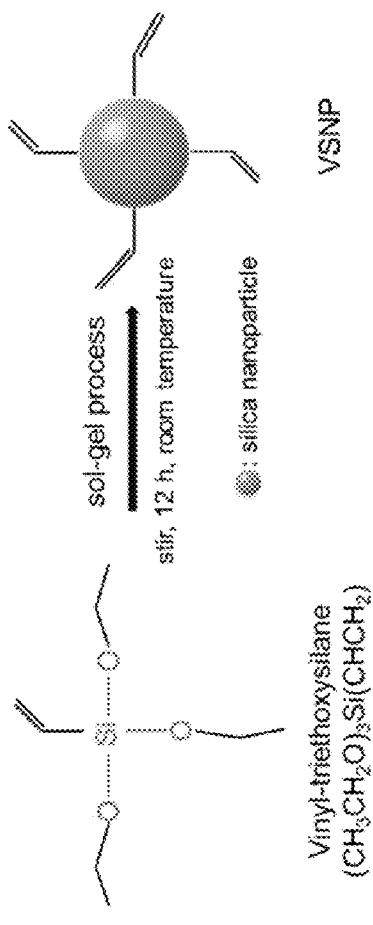
FIGS. 1(a) and (b) are a schematic representation of a preparation of the polyelectrolyte of the present invention.

The present invention provides in a first aspect a method for preparing a polyelectrolyte by reacting an effective amount of the following compounds to link said compounds:

A compound a) being a vinyl hybrid silica nanoparticle (VSNP); and

A compound b) containing a structural unit based on acrylic acid or a structural unit derived therefrom, namely containing the following structural unit of Formula (I) or a structural unit derived therefrom

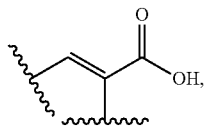

Formula (I)

wherein - - - - - - - - - means an optional bond and moiety, respectively.

Said reaction is carried out in the presence of a polymerization initiator, i.e. compound a) and compound b) are polymerized and linked together, respectively, in the presence of said initiator leading to a polymeric network of VSNPs as crosslinking point and polymerized chains of compound b, preferably poly acrylic acid (PAA) chains, i.e. chains consisting of the structural unit of Formula (III)

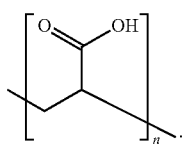

Formula (III)

wherein n is an integer of at least 2.

The method of the present invention allows for advantageous synergistic effects, namely VSNPs act as covalent crosslinking point and stress transfer center, i.e. strengthen the resulting polymeric network under large strains wherein the polymerized chains of compound b), preferably poly acrylic acid (PAA) chains, are formed simultaneously providing exceptional intra—as well as inter-molecular hydrogen bonding also referenced as "hydrogen bonding crosslinking". Namely, polymerized chains of compound b), preferably PAA chains, are double cross-linked by hydrogen bonding as well as VSNPs.

Said hydrogen bonding crosslinking proved to be highly advantageous for self-healing properties of the resulting polymer electrolyte. Moreover, broken inter-molecular hydrogen bonds can dynamically recombine to dissipate energy and homogenize the network under stretch. Phosphoric acid serves as the regulator of water and proton ion content, wherein the content of water and protons allows for an advantageous adaption of the ionic conductivity. Said synergistic effects are responsible for the multiple functions of super-stretchability and self-healability observed from the polyelectrolyte.

Commonly known and commercially used electrolytes usually have a randomly coiled conformation under the relaxed state. Once the imposed strain achieves a certain extent, it becomes difficult to uncoil the polymer chains. Then the energy can only be dissipated through the rupture of entangled polymer chains. In the case of the polyelectrolyte of the present invention, the propagation of cracks is delayed by dispersing the applied stress via the anchoring VSNPs, resulting in a high stretchability. In particular due to the intermolecular hydrogen bonds as reversible physical cross-linking points, said polyelectrolyte can dynamically break and recombine to dissipate energy. This dynamic process reorganizes the polymer chains and thus distributes the applied stress rapidly and uniformly over the entire network via the VSNPs acting as a stress transfer center. The intermolecular hydrogen bonds among the cross-linked polymer chains of compound b) on the VSNPs are also responsible for the superior self-healing property obtained.

The term VSNPs, i.e. vinyl hybrid silica nanoparticles, is known to the skilled person and methods for preparing the same are known, for example, from Shi et al. (Shi et al., J Mater Chem B, 2015, 3:1187-1192). The term "nanoparticles", in general, is used for particles with a diameter of below 1000 nm. The VSNPs, i.e. compound a), preferably have an average particle diameter of below 500 nm, further preferably of at most 100 nm, still further preferably of at most 50 nm and most preferably of less than 10 nm. In particular embodiments, the average diameter of the VSNPs is about 3 nm. The skilled person is aware of methods for determining the average diameter and able to select a suitable method. The average diameter preferably refers to the average of diameter measured with at least twenty VSNPs, in particular at least fifty VSNPs. A suitable method includes transmission electron microscopy. Smaller VSNP proved to be able to sustain much larger stress, i.e. the surface area is increased allowing for an increase in the density of crosslinking points in the polymeric structure.

Compound b) is preferably an acrylic acid monomer, i.e. compound b) preferably has a structure of Formula (II):

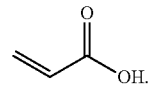

Formula (II)

The content of compound a) relative to the content of compound b), in particular an acrylic acid monomer, is preferably between 0.1 wt.-% and 5 wt.-%, more preferably between 0.1 wt.-% and 1 wt.-%, still more preferably between 0.1 wt.-% and 0.8 wt.-% and in particular between 0.1 wt.-% and 0.5 wt.-% and in especially preferred embodiments of the present invention about 0.1 wt.-% relative to the weight of compound b). When the content of compound a) becomes too high, the average polymer length of compound b) chains will be reduced while reducing its chain flexibility, but if the amount of compound a) is too low, the number of crosslinking points is reduced and less stress can be adsorbed by the polyelectrolyte.

The polymerization initiator is preferably ammonium persulfate. Usually no external crosslinking agents are used in the method of the present invention, in particular no ionic crosslinking agent such as $Fe(NO_3)_3$, is added. I.e. compound a), namely VSNPs, are preferably the only crosslinking agent used in said method.

Said method for preparing a polyelectrolyte comprises the steps of:
a) Providing an aqueous dispersion of the compound a);
b) Adding both, the compound b) and the polymerization initiator, to the dispersion obtained in step a) and stirring at a temperature of less than 10° C.;
c) Performing the polymerization at a temperature above 20° C.;
d) Optionally soaking the polymer from step c) in phosphoric acid with a concentration of preferably up to 70 wt.-%.

Step a) usually includes the preparation of compound a) from vinyl-triethoxysilane (VTES) as silica-precursor, preferably by a sol-gel-method, which method is generally known to the skilled person. In the method of the present invention, VTES is preferably added to a solvent, preferably said solvent comprises and more preferably consists of water. The water is preferably de-ionized water. Preferably, VTES is added to said solvent under stirring. More preferably, stirring is carried out until oil-like droplets completely disappear and a transparent dispersion is obtained. Accordingly, stirring is preferably carried out for at least 5 h, preferably at least 10 h. In particular embodiments, stirring is carried out for about 12 h. Preferably, stirring is carried out at a temperature of from 15° C. to 30° C., more preferably at a temperature of from 18° C. to 28° C., still more preferably at a temperature of from 20° C. to 27° C., in particular at 25° C.+/−2° C.

In step b), the compound b) and the polymerization initiator are added to the dispersion obtained from step a). This preferably means that compound b) and the polymerization initiator are added simultaneously or that one of them is added immediately after adding the other. The temperature in step b) is preferably less than 8° C., more preferably less than 5° C. In particular embodiments, the temperature is about 0° C. to 4° C. Preferably, during stirring the reaction mixture in step b) after addition of compound b) and the polymerization initiator is degassed and sealed under an inert atmosphere, preferably under nitrogen which allows for further removal of dissolved oxygen. In preferred embodiments of the present invention, compound b) is purified before addition to the dispersion obtained in step a) in particular by distillation under reduced pressure. Further preferably, compound b) is stored in a refrigerator before addition to the dispersion obtained in step a).

Step c) is the step commonly referred to as propagation. The temperature in step c), i.e. during the polymerization, is preferably at least 30° C., more preferably at least 30° C. and at most 45° C. In particular embodiments, the temperature is from 36° C. to 40° C. Step c) is preferably carried out for at least 12 h, more preferably for at least 24 h, further preferably for at least 28 h. In especially preferred embodiments, step c) is carried out for about 30 h.

Preferably, the method further comprises addition of water, usually de-ionized water, which is achieved during step d) when soaking the polymer from step c) in phosphoric acid, or as separate step following step c) or following step d). Preferably, water is added such that the water content of the polyelectrolyte reaches at least 20 wt.-%, further preferred at least 50 wt.-%, preferably at least 100 wt.-%, more preferably more than 100 wt.-% and still more preferably more than 300 wt.-% relative to the weight of compound b). In particular, the water content is 450 to 550 wt.-% such as about 507 wt.-%. With the increase of the water content, the movement of ions in the polymeric network, preferably a VSNPs-PAA network, becomes easier, and its chains are more sufficiently extended. Therefore, the ionic conductivity increases remarkably with the water content and is comparable to commonly used electrolytes such as polyvinyl alcohol-based electrolytes, strongly suggesting the use of the polyelectrolyte of the present invention as electrolyte for supercapacitors. The term "water content" with regard to the polyelectrolyte used herein refers to the amount of water relative to the weight of compound b) as used for preparing the polyelectrolyte unless otherwise defined. In preferred embodiments, compound b) is an acrylic acid monomer, hence, the water content refers to the weight of water relative to the weight of acrylic acid monomers as used for preparing the polyelectrolyte and PAA in the polyelectrolyte, respectively, in said embodiments.

In a further aspect, the invention provides the polyelectrolyte obtainable and obtained, respectively, by the method of the present invention described above, wherein compound b) is preferably acrylic acid monomer and compound a) preferably refers to VSNPs with an average diameter of below 500 nm, further preferably of at most 100 nm and especially preferably of less than 10 nm, in particular of about 3 nm. The polyelectrolyte preferably further comprises water, in particular de-ionized water, and phosphoric acid.

Said polyelectrolyte is preferably suitable for an energy storage device, in particular for a supercapacitor, in particular a solid-state supercapacitor. The ionic conductivity of the polyelectrolyte is preferably at least $10^{-4}$ S/cm, in particular at least $10^{-3}$ S/cm, and preferably about 0.0075 S/cm, at room temperature, i.e. between 20° C. and 25° C., preferably at 25° C.+/−2° C. The polyelectrolyte can preferably be stretched at least 30-fold, more preferably at least 36-fold without any visible crack, i.e. without any crack visible to the normal eye formed during elongation as determined by inspection.

The skilled person is aware of the term polyelectrolyte, usually understood to refer to polymers whose repeating units bear an electrolyte group. The skilled person is also aware of the term supercapacitor and solid-state supercapacitor, respectively.

The present invention further refers to a polyelectrolyte comprising and especially preferably consisting of:

Structural units of Formula (III):

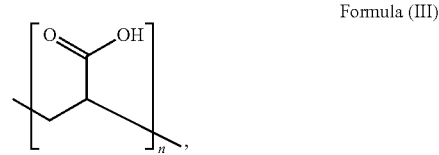

Formula (III)

in which n is an integer of at least 2;

Vinyl hybrid silica nanoparticles (VSNPs); and

Optionally phosphoric acid and protons derived from phosphoric acid, respectively; and Optionally water, usually de-ionized water;

wherein structural units of Formula (III) are preferably cross-linked by the VSNPs and by inter- and intramolecular hydrogen bonding of and between the structural units of Formula (III). Hence, said polyelectrolyte preferably comprises a double cross-linked polymeric network also referenced as "VSNPs-PAA network". Usually, no ionic bonds are formed in the VSNPs-PAA network and, thus, preferably no ionic bonding is present in said polyelectrolyte.

Preferably, the polyelectrolyte further comprises phosphoric acid or water, usually de-ionized water, especially preferably phosphoric acid and water. The water content of the polyelectrolyte is preferably at least 20 wt.-%, further preferred at least 50 wt.-%, preferably at least 100 wt.-%, further preferably more than 100 wt.-%, more preferably more than 300 wt.-% and in particular 450 to 550 wt.-% such as about 507 wt.-%, i.e. weight of water relative to the weight of PAA in the polyelectrolyte.

Said polyelectrolyte can preferably be stretched over 30-fold, more preferably over 36-fold without any crack, i.e. no cracks visible to the normal eye are formed during elongation as determined by inspection.

Said polyelectrolyte is self-healable when cut under ambient conditions, preferably self-healable under mild pressure, such as by simply contacting the wounded network without additional pressure, and temperatures of between 20° C. and 30° C., more preferably at 23° C. to 27° C. and in particular at about 25° C. The terms "self-healable" or "self-healing" according to the present invention refer to the property of a material to rebuild a polymeric network once said network is wounded, i.e. broken to format least two interfaces (also referenced as "wound"), in particular by interfacial hydrogen bonding between said interfaces to connect them. The rebuild network is preferably able to withstand for example 80 kPa of stress, preferably at least 80 kPa of stress.

Preferably, the polyelectrolyte has after one healing cycle at least 80%, more preferably at least 85% of the initial ionic conductivity, i.e. the ionic conductivity with an intact polymeric network without wounds. More preferably, the polyelectrolyte has after two healing cycles at least 75%, more preferably at least 80% of the initial ionic conductivity. The ionic conductivity of the polyelectrolyte after three healing cycles and still more preferred after four healing cycles is at least 75%, more preferably at least 80% of the initial ionic conductivity.

The polyelectrolyte is preferably suitable for an energy storage device, more preferably suitable for a supercapacitor and a solid-state supercapacitor, respectively.

The invention further provides a polymerizable composition useful in forming a polyelectrolyte, comprising an effective amount of compound a), compound b) and ammonium persulfate. Said polymerizable composition preferably comprises a solvent, more preferably water, in particular de-ionized water. Also in accordance with the present invention is a method for producing a polyelectrolyte from said polymerizable composition comprising the steps of:

a) Stirring the polymerizable composition at a temperature of less than 10° C., preferably less than 5° C. and more preferably at about 0° C. to about 4° C.; and
b) Performing the polymerization at a temperature above 20° C., more preferably above 30° C. and still more preferably at a temperature of about 36° C. to 40° C.;
c) Optionally soaking the polymer obtained in step b) in phosphoric acid with a concentration of up to 70 wt.-%.

Preferably, said method for producing the polyelectrolyte from the polymerizable composition according to the present invention comprises a further step following step b) or following the optional step c), in which water, usually de-ionized water, is added to the polymer obtained in step c). Compound b) is preferably acrylic acid monomer and compound a) preferably refers to VSNPs with an average diameter of below 500 nm, further preferably of at most 100 nm and especially preferably of less than 10 nm, in particular of about 3 nm.

The present invention also refers to an energy storage device comprising a polyelectrolyte obtainable and obtained, respectively, by reacting an effective amount of each of the following compounds in the presence of a polymerization initiator to link said compounds:

A compound a) being a vinyl hybrid silica nanoparticle (VSNP); and
A compound b) containing the following structural unit based on acrylic acid or a structural unit derived therefrom, namely a structural unit of Formula (I) or a structural unit derived therefrom

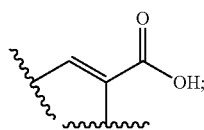

Formula (I)

wherein - - - - - - - - - means an optional bond and moiety, respectively, and wherein said reaction of an effective amount of compound a) and compound b) in the presence of a polymerization initiator comprises the steps of:
a) Providing an aqueous dispersion of the compound a);
b) Adding both, the compound b) and the polymerization initiator, to the dispersion obtained in step a) and stirring at a temperature of less than 10° C.;
c) Performing the polymerization at a temperature above 20° C.;
d) Optionally soaking the polymer from step c) in phosphoric acid preferably having a concentration of up to 70 wt.-%.

Preferably, said reaction further comprises the step of adding water, usually de-ionized water, after step c) or after step d) to the polymer such that the water content of the polyelectrolyte is preferably at least 20 wt.-%, further preferably at least 50 wt.-%, further preferably at least 100 wt.-%, further preferably more than 100 wt.-%, more preferably more than 300 wt.-% and in particular 450 to 550 wt.-% such as about 507 wt.-% relative to the weight of compound b). Presence of water or phosphoric acid, especially water and phosphoric acid, allows for further enhanced specific capacitances due to increased ion mobility and convenient ion transfer in said electrolyte. Water may alternatively be added by soaking the polymer from step c) in phosphoric acid, i.e. in step d).

Preferably, the energy storage device is a supercapacitor, in particular a solid-state supercapacitor. Said energy storage device, in particular said solid-state supercapacitor, preferably further comprises at least one polypyrrole (PPy)-deposited carbon nanotube (CNT) paper electrode (also referenced as "PPy-CNT paper electrode" or "PPy@CNT paper electrode"). More preferably, the energy storage device, preferably said solid-state supercapacitor, comprises two PPy-CNT paper electrodes, wherein these electrodes preferably serve as both active material and as current collector simultaneously. In preferred embodiments, the energy storage device, in particular a solid-state supercapacitor, does not comprise any binder or separator. In embodiments of the present invention, the energy storage device is a solid-state supercapacitor comprising and in particular consisting of the polyelectrolyte and two PPy-CNT paper electrodes.

In preferred embodiments of the present invention, said solid-state supercapacitor further comprises patches of carbon nanotube (CNT) paper (further referenced as "CNT paper patches") for further supporting the excellent self-healability of said solid-state supercapacitor, preferably at least two CNT paper patches, usually paved on wounds, i.e. cracks present in the outer surface of said solid-state supercapacitor, also referenced as "outer crack areas", which cracks further proceed through at least one PPy-CNT paper electrode into the polyelectrolyte. Said CNT paper patches have a smaller size and smaller dimensions compared to the PPy-CNT paper electrodes, the respective size depends on the size of the outer crack area. Said CNT paper patches comprise carbon nanotubes (CNT). Preferably, CNT paper patches comprise 98 wt.-% of carbon nanotubes. The size of the CNT paper patches is preferably smaller than 1 cm×2 cm, in particular about 0.5 cm×1.5 cm.

The solid-state supercapacitor of the present invention preferably allows for more than 80%, in particular for more than 90%, more preferably at least 95% and in particular about 100% healing efficiency as calculated from CV or calculated from GCD even after 20 breaking/healing cycles. As shown in FIG. 4(a), one breaking/healing cycle includes the steps of cutting the solid-state supercapacitor into two pieces such that both pieces have two PPy-CNT paper electrodes and a polyelectrolyte in between, bringing both pieces in contact at the cut boundary, i.e. formed interfaces, and attaching CNT paper patches to the outer surfaces of the supercapacitor in the area of said cut boundaries, namely in the contact area of both pieces (outer crack areas), such that said areas are partially or preferably completely covered by the CNT paper patches.

The solid state supercapacitor of the present invention preferably has a stretchability of at least 300%, more preferably at least 400% and in particular of at least 600%, i.e. the solid state super capacitor can be stretched at least up to 3-fold, preferably at least up to 4-fold and in particular at least up to 6-fold of the initial length without cracks formed during stretching and being visible to the normal eye after inspection.

The solid-state supercapacitor preferably has a specific capacitance at least 150 F g$^{-1}$ at a scan rate of 5 mV/s, at least 130 F g$^{-1}$ at a scan rate of 10 mV/s, at least 100 F g$^{-1}$ at a scan rate of 100 mV/s and at least 25 F g$^{-1}$ at a scan rate of 500 mV/s. Said solid state supercapacitor preferably has a specific capacitance at least 150 F g$^{-1}$ at a charge/discharge current of between 0.1 mA and 2.5 mA and further preferably a specific capacitance at least 100 F g$^{-1}$ at a charge/discharge current of 5 mA.

The present invention still further provides a method for manufacturing a solid-state supercapacitor comprising a polyelectrolyte and two PPy-CNT paper electrodes which method comprises the step of placing two PPy-CNT paper electrodes on opposite sides of a film of a polyelectrolyte. I.e. the PPy-CNT paper electrodes are spaced by said film wherein the thickness of said film preferably defines the distance between both PPy-CNT paper electrodes. The skilled person is aware of the term "film" in the field of energy storage devices. It generally refers to a planar material with a length and width larger than its thickness.

Said polyelectrolyte is obtainable or obtained by reacting an effective amount of each of the following compounds in the presence of a polymerization initiator to link said compounds:

A compound a) being a vinyl hybrid silica nanoparticle (VSNP); and
A compound b) containing a structural unit based on acrylic acid or a structural unit derived therefrom, namely a structural unit of Formula (I) or a structural unit derived therefrom

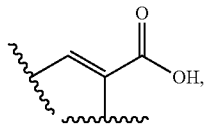

Formula (I)

wherein - - - - - - - - - means an optional bond and moiety, respectively, and wherein said reaction of an effective amount of compound a) and compound b) in the presence of a polymerization initiator comprises the steps of:

a) Providing an aqueous dispersion of the compound a);
b) Adding both, the compound b) and the polymerization initiator, to the dispersion obtained in step a) and stirring at a temperature of less than 10° C.;
c) Performing the polymerization at a temperature above 20° C.;
d) Preferably soaking the polymer from step c) in phosphoric acid, which preferably has a concentration of up to 70 wt.-%.

Said production of the solid-state supercapacitor preferably takes less than 10 minutes, usually only several seconds.

Figure 5A:
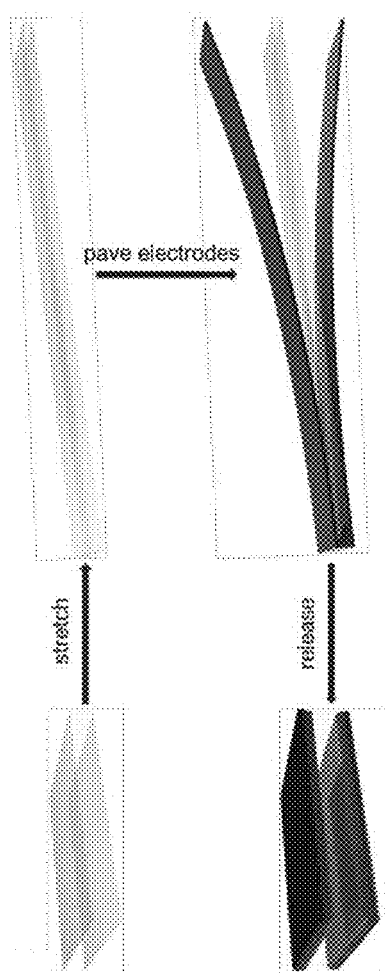
Figure 5B:
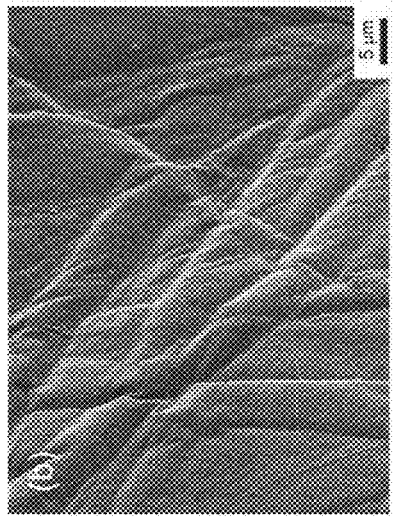
Figure 5D:
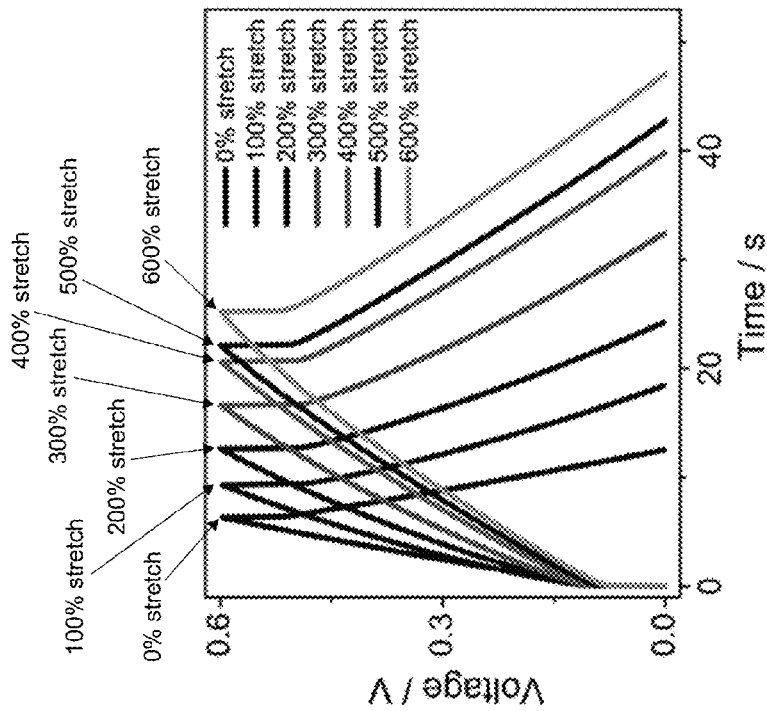

Preferably, said PPy-CNT paper electrodes are directly attached to the film of polyelectrolyte, i.e. the step of placing two PPy-CNT paper electrodes on opposite sides of a film of the polyelectrolyte is carried out by directly attaching the PPy-CNT paper electrodes to opposite sides of the film of the polyelectrolyte. "Directly attached" means that there is no further material between the PPy-CNT paper electrode and the polyelectrolyte. Hence, in preferred embodiments, no binder is used when preparing the solid-state supercapacitor. Preferably, the supercapacitor does not comprise a separator. The latter allows for further simplification of the production of the supercapacitor and reduction of costs for preparing the same. Preferably, the PPy-CNT paper electrodes have a wavy structure such as illustrated in FIG. 5(b).

The thickness of the film of the polyelectrolyte is preferably less than 10 mm, more preferably less than 8 mm and in particular from 2 mm to 6 mm. The thickness of a PPy-CNT paper electrode is preferably less than 100 nm, further preferred less than 90 nm. Such dimensions of the PPy-CNT paper electrode allow for further increase of the ion transport during charge and discharge.

Preferably, the method for manufacturing a solid-state supercapacitor further comprises a step of pre-stretching the film of the polyelectrolyte before placing the PPy-CNT paper electrodes on opposite sides of the stretched film. Said film is preferably pre-stretched to at least 100%, more preferably at least 200%, still more preferably at least 400% and in particular at least 600% compared to the initial length. Such pre-stretching step allows for further improvement of the stretchability of the prepared solid-state supercapacitor. In particular, the resulting wavy structure of the PPy-CNT paper electrodes after compression, i.e. after relaxation, avoids the disadvantage of commonly known devices whose performances are strongly limited by the structural breakdown arising from the stretch imposed.

In preferred embodiments, the method for manufacturing the solid-state supercapacitor further comprises steps for preparing the PPy-CNT paper electrodes including the step of electrodepositing CNT papers with polypyrrole preferably from an aqueous pyrrole solution further containing p-toluenesulfonic acid and sodium toluenesulfate. Pyrrole is preferably distilled before the electrodeposition in order to purify the pyrrole monomers. Preferably, the electrodeposition of CNT papers with polypyrrole is carried out at 0.8 V versus Ag/AgCl for preferably at least 5 min, more preferably at least 8 min and in particular about 10 min and preferably at a temperature of about 0° C. More preferably, electrodeposition is carried out from a solution of 0.1 M p-toluenesulfonic acid, 0.3 M sodium toluenesulfate and 0.5% pyrrole monomer (v/v).

In particular embodiments, said method for manufacturing a solid-state supercapacitor consists of:

Optionally electrodepositing CNT papers with polypyrrole;

Optionally preparing a film of the polyelectrolyte describe above and preferably pre-stretching said film;

Placing two PPy-CNT paper electrodes on opposite sides of the film of the polyelectrolyte, which film is optionally pre-stretched.

Optionally, patches of CNT paper, preferably at least two, can be paved on the PPy-CNT paper electrodes at possible outer crack areas to further support the excellent self-healability of the solid-state supercapacitor of the present invention.

Further in accordance with the present invention is a method for repairing a solid-state supercapacitor comprising two PPy-CNT paper electrodes and a polyelectrolyte as described above between both PPy-CNT paper electrodes, which solid-state supercapacitor has at least one crack present at the outer supercapacitor surface (also referenced as "outer crack area"), which crack at least proceed through the PPy-CNT paper electrode and into the polyelectrolyte. Said method for repairing a solid-state supercapacitor comprises paving at least one CNT paper patch on the outer crack area such that said outer crack area is partially or preferably completely covered by the CNT paper patch. This further supports the excellent self-healability of the solid-state supercapacitor representing a method for CNT paper patch supported self-healing of said solid-state supercapacitor. Preferably, one CNT paper patch is applied to one outer crack area.

Said crack may further proceed through the opposite PPy-CNT paper electrode, i.e. dividing the solid-state supercapacitor into two pieces both having two PPy-CNT paper electrodes and a polyelectrolyte in between, i.e. two outer crack areas are formed. In such embodiments, the method further comprises bringing both pieces in contact at the interfaces formed because of the crack, i.e. the crack boundaries, before paving CNT paper patches at the outer crack areas.

Said CNT paper patch is preferably applied to the crack area at a temperature of between 20° C. to 28° C., preferably at about 25° C.+/−2° C.

The examples set out below further illustrate the invention. The preferred embodiments described above and the drawings as well as examples given below represent preferred or exemplary embodiments and a skilled person will understand that the reference to those embodiments or examples is not intended to be limiting.

EXAMPLES

Example 1a

Preparation of a Polyelectrolyte

Figure 1B:
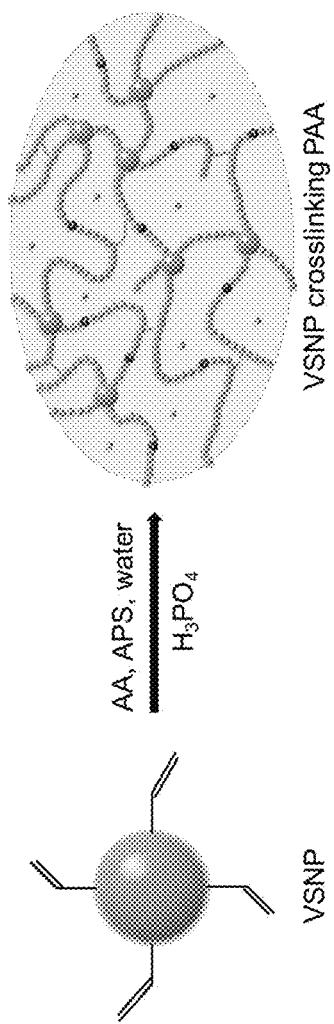
FIG. 1(b) exemplarily illustrates the preparation of a VSNPs-PAA polyelectrolyte from VSNPs as cross-linker, acrylic acid monomer as compound b), ammonium persulfate as polymerization initiator and phosphoric acid as pH and water content regulator. The large circles represent VSNPs, the chains in between with smaller circles represent PAA, hydrogen bonds between the PAA chains are illustrated as lines connecting PAA chains as well as protons are the circles within the VSNP-PAA network and dark circles along the PAA chains illustrate anions.

A sol-gel method has been employed for the preparation of VSNPs (FIG. 1a). Acrylic acid monomer and VSNPs were polymerized together in the presence of ammonium persulfate as the initiator. Phosphoric acid serves as the regulator of water and proton ion content (FIG. 1b).

Firstly, vinyl-triethoxysilane (VIES, 3.8 g, Alfa Asear) was added into de-ionized water (30 g) under vigorous stirring at room temperature until the oil-like droplets completely disappeared and a transparent dispersion of vinyl hybrid silica nanoparticles was obtained (about 12 h). Acrylic acid monomer (6 g, Beijing Chemical Reagent) and ammonium persulfate (0.012 g, Xilong Chemical) were then added into the diluted aqueous dispersion of vinyl hybrid silica nanoparticles (24 mL, 0.125 wt. %) and stirred at 0-4° C. Prior to use, acrylic acid monomer was purified by distillation under reduced pressure and stored in a refrigerator. During the magnetic stir, the solution was degassed and sealed under $N_z$ in order to remove the dissolved oxygen. Next, free-radical polymerization was allowed to proceed in a water bath at 38±2° C. for 30 h. Last, the as-prepared polymer was soaked in phosphoric acid (500 ml, 0-70 wt.-%).

Example 1b

Determination of Physicochemical and Electrochemical Properties of the Polyelectrolyte Prepared in Example 1a First, a VSPNs-PAA belt was bisected using a scissor. Then the fresh wounds were brought into contact under a mild pressure and left alone in the ambient condition. After the breakage was successfully self-healed within several minutes, the belt could be stretched hard without breaking (FIG. 2(e) and FIG. 2(f)). After 4 breaking/healing cycles, the ionic conducting properties were well restored (FIG. 2g). The complete self-healing is expected to arise from abundant reversible intermolecular hydrogen bonding cross-links. When breakage occurs in the contact region, the broken hydrogen bonds can recombine together through coordination of carboxyl groups on the polyacrylic acid main chains (FIG. 2h).

The polyelectrolyte has been stretched, wherein a polyelectrolyte sample with a water content of 150 wt.-% relative to the weight of PAA in the polyelectrolyte has been tested. Said polyelectrolyte proved to exhibit super-stretchability over 36-fold strain (FIG. 2(b) and FIG. 2(c)), which is much higher than those of commonly known highly stretchable polymers. As mentioned above, such super-stretchability seems to arise in particular from the VSNPs-aided toughening and hydrogen bonding crosslinking (FIG. 2(d)).

Ionic conductivity of the polyelectrolyte has been determined by using a multi-meter to measure the resistance R of the polyelectrolyte, then by using a ruler to measure the length L and cross-section area A. The ionic conductivity can be obtained by L/(R×A). The ionic conductivity has been determined for different amounts of water proving that ionic conductivity increases remarkably with the water content and is comparable to known polyvinyl alcohol electrolytes (FIG. 2a). With the increase of the water content, the movement of ions in the VSNPs-PAA is expected to become easier, and the VSNPs-PAA chains are more sufficiently extended.

Example 2a

Preparation of a Solid-State Supercapacitor Comprising the Polyelectrolyte Prepared in Example 1a For producing PPy/CNT paper electrodes, CNT papers were electrodeposited with PPy at 0.8 V vs. Ag/AgCl for 10 min in a solution of 0.1 M p-toluenesulfonic acid, 0.3 M sodium toluenesulfate, and 0.5% pyrrole monomer (v:v) at 0° C. Prior to electrodeposition, pyrrole was distilled in order to purify pyrrole monomers.

A VSNPs-PAA polyelectrolyte prepared in Example 1a in form of a film with 507 wt.-% water based on the weight of the PAA in the polyelectrolyte was used as electrolyte without further treatment. PPy electrodeposited on CNT papers were utilized as both active materials and current collectors to construct a solid-state supercapacitor. Besides capacitance contribution, the flexible PPy proved to serve as a stress buffer during stretch. Two PPy-CNT paper electrodes were directly paved on the VSNPs-PAA film electrolyte without binder or separator under ambient conditions.

Example 2b

Determination of Physicochemical and Electrochemical Characteristics of a Solid-State Supercapacitor Prepared in Example 2a The performance of the assembled supercapacitor was measured by CV and GCD in a two-electrode configuration using the potentiostat (CHI 760E). Electrochemical impedance spectra (EIS) were measured at frequencies ranging from 0.01 Hz to 5000 Hz with a potential amplitude of 5 mV. All measurements were carried out at room temperature. The specific capacitance with respect to the single electrode ($C_m$) was calculated using the charge integrated from GCD and CV curves individually according to the equations:

$$C_m = \frac{2It}{Um} \quad (I)$$

$$C_m = \frac{1}{Uvm}\int_{U_-}^{U_+} i(U)\,dU \quad (II)$$

where I is the discharge current during GCD, t is the discharge time during GCD, U is the voltage range ($U=U_+-U_-$), m is the mass of PPy on one electrode, v is the scan rate of the CV curve, and i(U) is the current during CV.

The tensile strength of the VSNPs-PAA polyelectrolyte was measured by a mechanical testing system (Zwick Z030). The microstructure and morphology of electrodes were characterized by scanning electron microscope (SEM) (JEOL JSM-6335F) with an acceleration voltage of 5 kV. Raman spectroscopy spectra were obtained by RENISHAW Raman microscope with an excitation wavelength of 633 nm.

Firstly, the morphology of CNT paper and of PPy-CNT paper has been determined. FIG. 3(b) shows that CNT papers have a typical morphology of interweaved nanowires. In contrast, a thin film of PPy is uniformly electrodeposited on CNT papers (FIG. 3c).

The PPy-deposited CNT electrode was intentionally folded prior to the SEM observation. It is noteworthy that there is no crack on the electrode due to the good flexibility of both PPy and the CNT paper.

Figure 7:
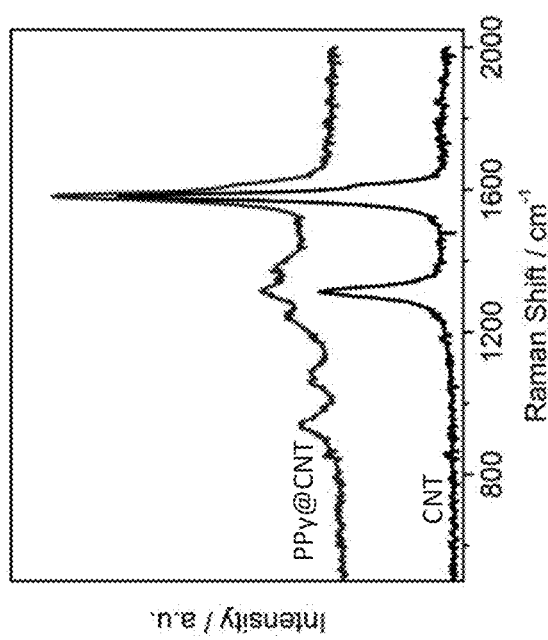
FIG. 7 shows Raman spectroscopy spectra of CNT and PPy-CNT.

The as-prepared species was confirmed by Raman spectroscopy (FIG. 7). Two typical peaks of CNT at 1314 cm$^{-1}$ and 1580 cm$^{-1}$ were observed, which correspond to the D band (vibrations of carbon atoms with the sp$^3$ electronic configuration) and the G band (in-plane vibration of the carbon atoms with the sp$^2$ bond), respectively. The Raman spectrum confirmed the species of PPy. The band at 631 cm$^{-1}$ is attributed to the ring torsion. The region at 685 cm$^{-1}$ corresponds to the C—H wagging. The peak around 935 cm$^{-1}$ corresponds to the ring deformation. The band at 987 cm$^{-1}$ is attributed to the ring deformation associated with dictation. The peaks at 1059 cm$^{-1}$ and 1092 cm$^{-1}$ correspond to the symmetrical C—H in-plane bending and N—H in-plane deformation. The peaks at 1249 cm$^{-1}$ and 1316 cm$^{-1}$ are attributed to the antisymmetrical C—H in-plane bending and antisymmetrical in-ring C—N stretching, respectively. C—C and C—N stretching are reflected at both 1382 cm$^{-1}$ and 1506 cm$^{-1}$ Beside the G band of CNT, the peak at 1580 cm$^{-1}$ is an overlap of C—C in-ring and C—C inter-ring stretching resulting from radical cation and dictation.

Figure 6:
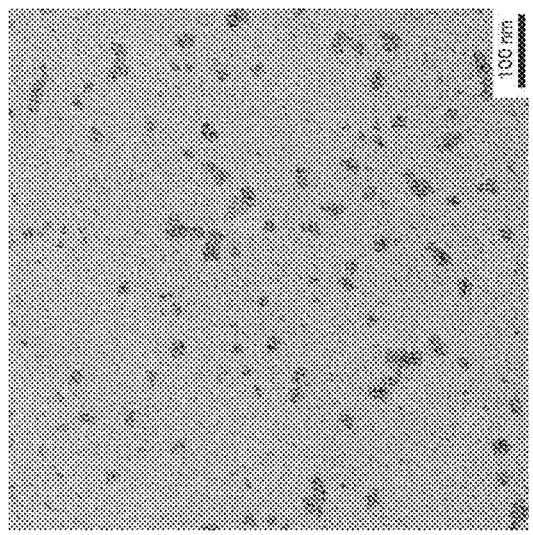
FIG. 6 shows a transmission electron microscopy (TEM) image of highly monodispersed vinyl hybrid silica nanoparticles (VSNPs) with an average diameter of 3 nm.

The PPy has a thin thickness less than 90 nm (FIG. 3c), favoring the fast ion transport during charge/discharge. The TEM image (FIG. 6) revealed that the VSNPs are highly monodispersed with an average diameter of 3 nm by a sol-gel synthesis.

Cyclic voltammetry (CV) curves at scan rates up to 1000 mV s$^{-1}$ and galvanostatic charge/discharge (GCD) curves at various currents from 0.1-5 mA have been prepared (FIG. 3(d) and FIG. 3(e)). It should be noted that the scan rates achieved here are much higher than most rates of PPy-based electrodes measured even in aqueous electrolytes, and CVs keep the rectangular shape at a high scan rate of 250 mV/s. This indicates that the solid-state supercapacitor can endure very fast voltage/current change rates, which is assumed to be a result for example of the excellent ionic conductivity of the polyelectrolyte and effective electrochemical dynamic processes in the electrodes.

Figure 8:
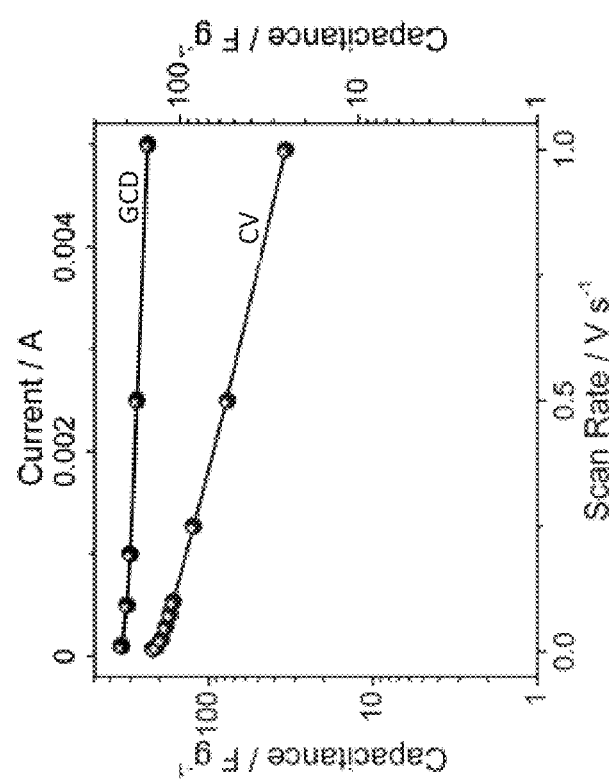
FIG. 8 shows graphs of the specific capacitances calculated from CV and GCD curves of the PPy-CNT paper electrodes using a VSNPs-PAA polyelectrolyte film of the present invention with a water content of 507 wt. %.

Specific capacitances were calculated using both these CV and GCD curves (FIG. 8 and FIG. 9), which are comparable to or even higher than results tested in liquid electrolytes with the same mass ratio of the electrolyte composition. This suggests that the VSNPs-PAA polyelectrolyte is a highly promising alternative to PVA as the electrolyte without compromising the electrode performance.

Figure 10:
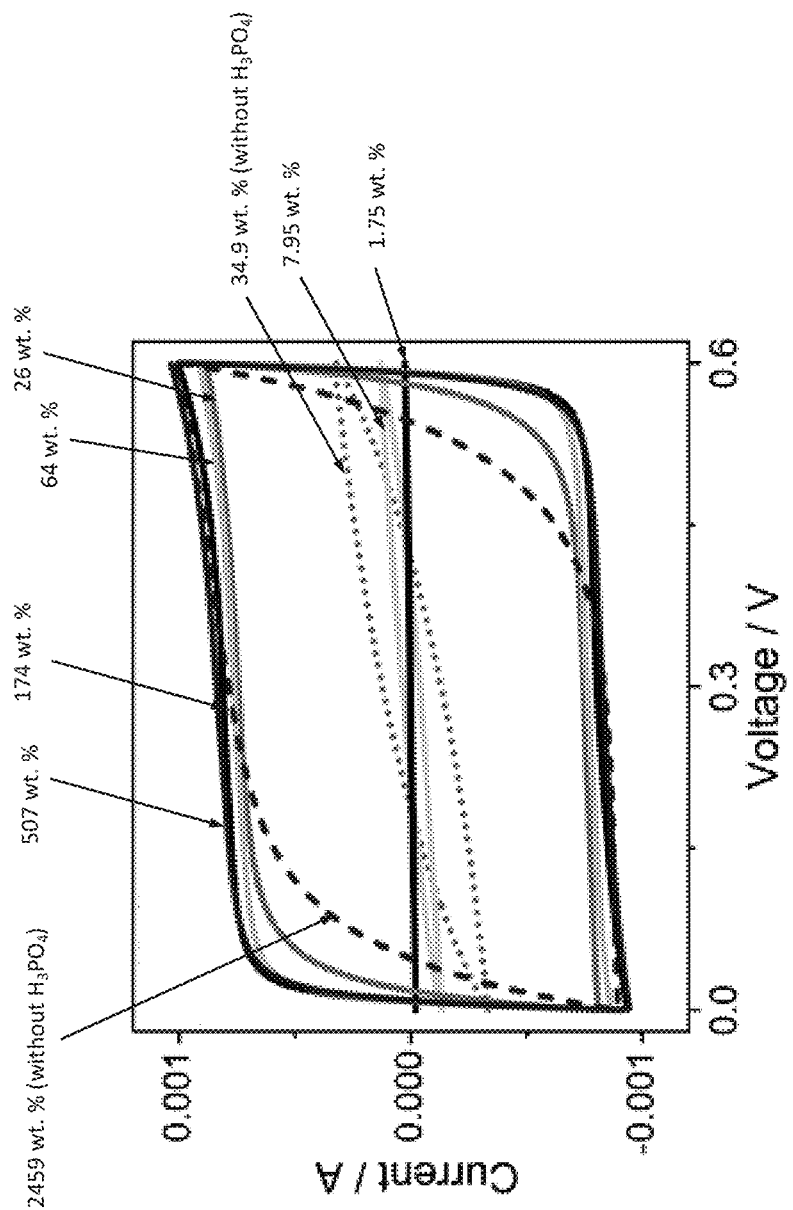
FIG. 10 shows CV curves with various water content from 1.75 to 507 wt. %, i.e. weight of water relative to the weight of PAA in the polyelectrolyte, at a scan rate of 25 mV/s.

Being consistent with the ionic conductivity affected by water content in the VSNPs-PAA polyelectrolyte, the CV and GCD curves proved to be remarkably different under various water contents (FIG. 10). Under all scan rates and charging/discharging currents, the specific capacitance increased with the water content in the range of 1.75 to 507 wt. %, varying up to four orders of magnitude (FIG. 3(f) and FIG. 3(g)). The enhanced capacitances can be attributed for example to the high ion mobility in the large amount of water and convenient ion transfer in the moisturized electrolyte/electrode interface. Electrochemical impedance spectroscopy measurements carried out (FIG. 3(h)) also indicated these. The supercapacitor showed the small systematic resistance (the intercept at the Z'-axis) and overall impedance (the endpoint in the Nyquist plot) when the water amount is large (FIG. 3(h)).

The sufficiently extended polymer chains favored the ion transportation in the electrolyte and at the electrolyte/electrode interface, therefore reduced the resistance and increased the specific capacitance. Besides water content, the protons penetrated into the VSNPs-PAA also contribute to capacitance enhancement. As observed in FIGS. 3(f)-(h), the performances of VSNPs-PAA with higher water contents while without H$_3$PO$_4$ penetration proved to be much inferior. Their difference was more obvious at faster scan rates and higher charging/discharging currents, revealing the transportation role of available ions during the fast electrochemical dynamic process.

Example 2c

Determination of the Self-Healing Properties of a Solid-State Supercapacitor Prepared in Example 2a To determine the self-healing properties of the supercapacitor, the solid-state supercapacitor prepared in Example 2a was cut into two pieces such that both pieces have two PPy-CNT paper electrodes and a polyelectrolyte in between.

Subsequently, both pieces were brought in contact at the cut boundary, and CNT paper patches have been attached to the outer crack areas of the supercapacitor, i.e. in the area of said cut boundaries, namely in the contact area of both pieces, such that said outer crack areas are covered by the CNT paper patches. The schematic illustration of one breaking/healing cycle is shown in FIG. 4a. Several breaking/healing cycles have been carried out subsequently.

Electrochemical performances of the patch-assisted self-healable supercapacitor were systematically investigated. The methods have been described above.

Figures 4B, 4C:
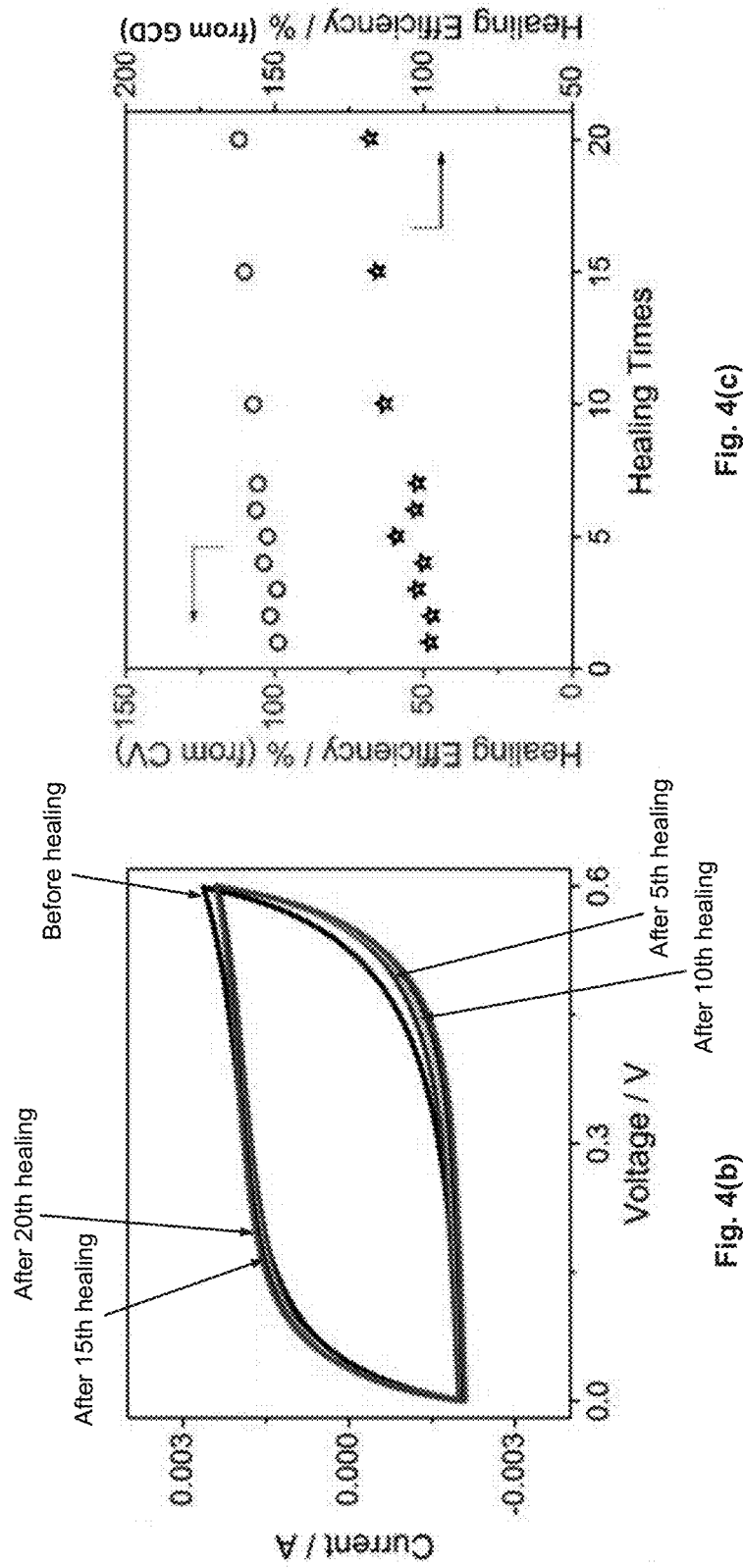
Figure 11A:
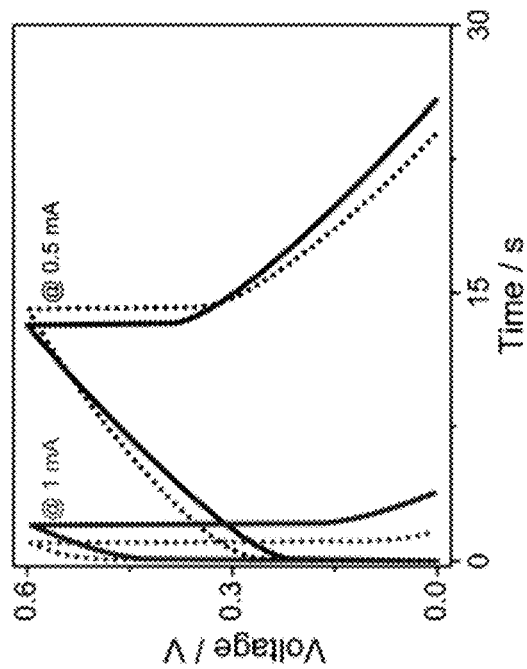
FIGS. 11(a) and 11(b) show CV and GCD curves, respectively, of a supercapacitor without a patch before (solid) and after (dotted) the $1^{st}$ breaking/healing cycle.
Figure 11B:
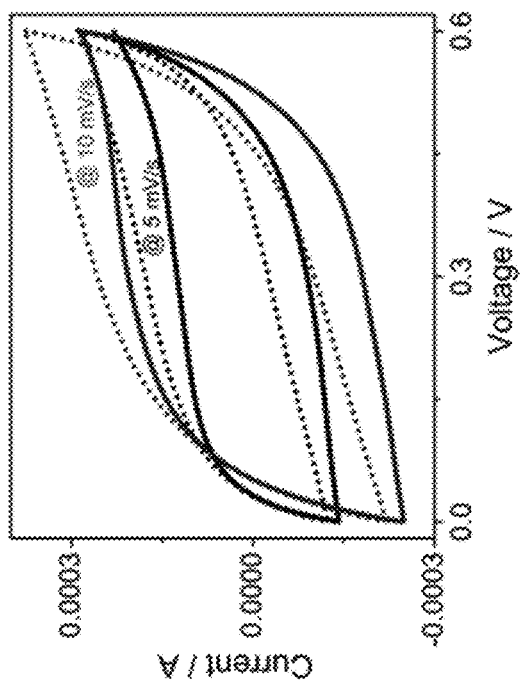
Figure 12:
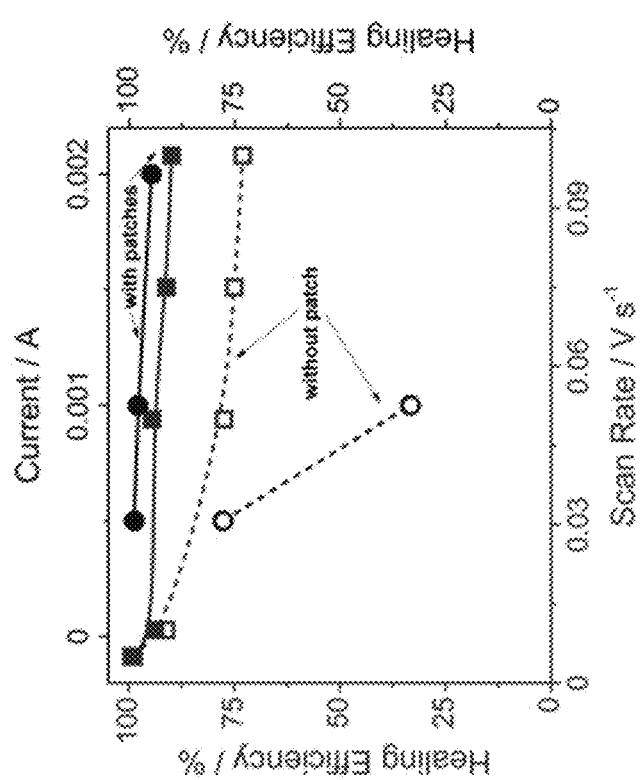
FIG. 12 shows graphs relating to the healing efficiency of the self-healing supercapacitor of the present invention with (solid) and without (hollow) patches calculated from CV (rectangle) and GCD (circle) curves.

Amazingly, both CV and GCD curves revealed to almost completely overlay even after the $20^{th}$ breaking/healing cycle (FIG. 4(b) and (d)). The healing efficiency proved to be around 100% during all breaking/healing times (see FIG. 4(c)) extremely outperforming other known self-healable devices. The results revealed the superiority of adopting the self-healable polyelectrolyte of the present invention over conventional methods, which for example use self-healable outer or inner additional components to facilitate self-healing. This excellent self-healing property may also be attributed to the good electrical conductivity of CNT paper patches which connected the broken parts well (FIG. 11 and FIG. 12). The electrochemical performances of a supercapacitor without a patch deteriorated after one breaking/healing cycle, as revealed by the smaller CV loop, less discharging time, higher resistance and distorted CV and GCD curves (FIG. 11(a) and FIG. 11(b)). The healing efficiencies with the aid of patches proved to be superior to those without patches at all scan rates and charging/discharging currents (FIG. 12).

Interestingly, the healing efficiency slightly fluctuated around 100% in these breaking/healing cycles. This could be attributed to the accidental micro-adjustment between the broken electrodes. That is, the macroscopically manual operation would cause the occasionally microcosmic adjustment of the reconnected electrodes, leading to little fluctuation of the performance during breaking/healing cycles. Hence, it is also the utilization of an intrinsically self-healable polyelectrolyte and small CNT patches that makes the supercapacitor of the present invention exhibit such extremely self-healability which is highly attractive for high performance self-healable devices.

The supercapacitor effectively powered a LED bulb after self-healing (FIG. 4(e)).

Example 3a

Preparation of a Solid-State Supercapacitor Comprising the VSNPs-PAA Electrolyte Prepared in Example 1a Under Super-Stretch and Compress To fabricate a super-stretchable supercapacitor, a film of the VSNPs-PAA polyelectrolyte prepared in Example 1a was first pre-stretched to 600% strain. The PPy-CNT papers as prepared in Example 2a were then paved on opposite sides of the stretched electrolyte layer. After releasing, the supercapacitor was realized with a wavy electrode structure (FIG. 5(a)). The electrodes were stably attached on the polyelectrolyte. Due to the excellent flexibility of the PPy-CNT paper, no crack on the wavy electrodes was observed from the SEM image (FIG. 5(b)).

Example 3b

Determination of Physicochemical and Electrochemical Characteristics of a Solid-State Supercapacitor Prepared in Example 3a Methods for testing the physicochemical and electrochemical characteristics as already described in Example 2b have been used.

SEM image showed a wavy structure of the released PPy-CNT paper electrode. Said wavy structure further avoids the disadvantage of general stretchable devices whose performances are usually limited by the structural breakdown arising from the stretch imposed.

Figure 5C:
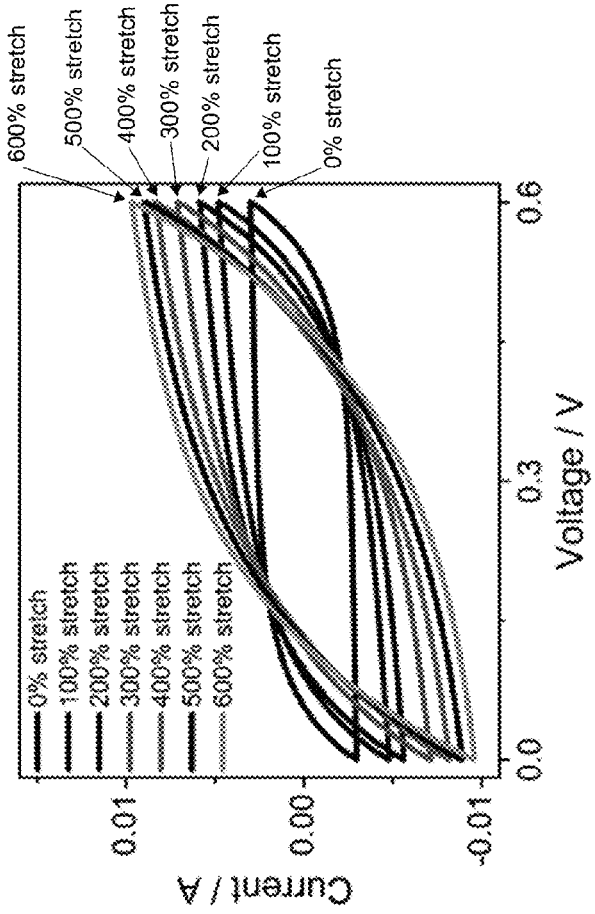

The supercapacitor prepared in Example 3a exhibited enhanced electrochemical performances under stretch (FIGS. 5(c) and (d)). Both CV and GCD profiles expanded with the increase of strain. The capacitance calculated from CV and GCD curves achieved a percentage increase of more than 100% and more than 250%, respectively, as the tensile strain increases from 0 to 600% (FIGS. 5(e) and (f)). The larger contact area between electrodes and the polyelectrolyte induced by stretch is assumed to contribute to said increased capacitance. As shown in FIGS. 5(a) and (b), uncontacted areas on the free wavy electrodes are expected to exist. Upon stretching, some initially uncontacted parts contact with the electrolyte, thus allowing for further effective electrode materials participating in the electrocapacitive process. As the highly flexible electrodes are paved following the pre-stretch of the electrolyte, there is no structural breakdown induced by the stretch applied afterward.

Figure 13:
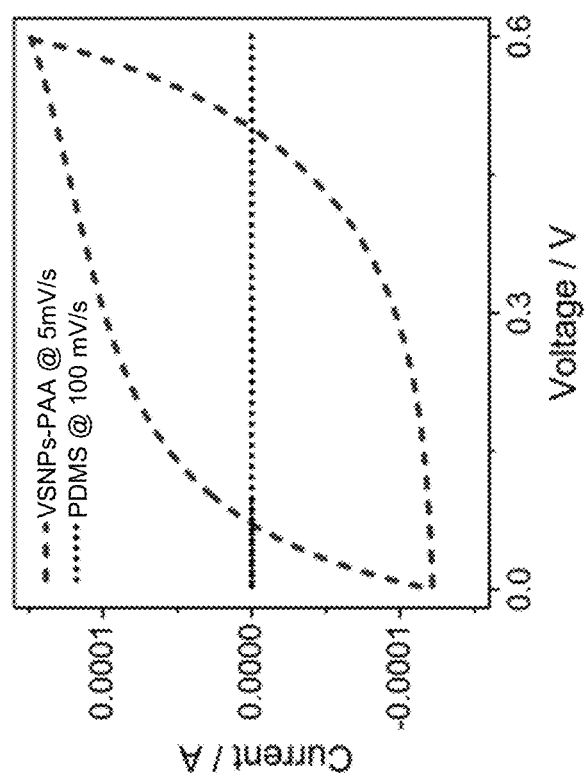
FIG. 13 shows comparative CV curves of supercapacitors using electrolytes of VSNPs-PAA (dashed) at a scan rate of 5 mV/s and PDMS (dotted) at a scan rate of 100 mV/s.

Polydimethylsiloxane (PDMS) being a common substrate material used in super-stretchable devices has been tested in a comparative test which test revealed that PDMS cannot fulfill the function as an electrolyte due to the lack of free-moving ions (FIG. 13). Compared with VSNPs-PAA, there is no CV loop when PDMS is used as the electrolyte even at a high scan rate of 100 mV/s.

Figure 15:
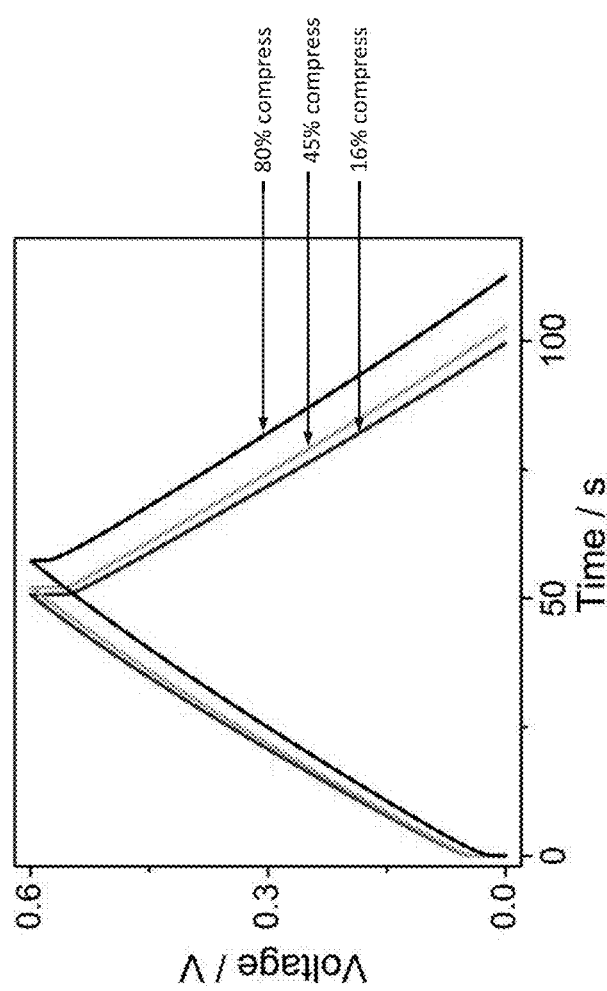
FIG. 15 shows GCD curves of the supercapacitor under various compressive strains at a charging/discharging current of 0.5 mA.

Being similar to the case of stretch, specific capacitances also revealed to be increased with the compressive strains (FIG. 5(g)). Since the effect of electrolyte thickness on the capacitance is ignorable in said tests, the pressure-improved interfacial contact between the electrolyte and the electrodes should be a reason of the raised performance under compression. The supercapacitor proved to have smaller systematic resistance (the intercept at the Z'-axis) at higher compressive strain (FIG. 5(h)). This is also confirmed by the decreased IR drop measured and shown in FIG. 15. This indicates that the compressive stress further improves the interfacial contact and therefore the ion transfer from the polyelectrolyte to the surface of electrode, which further contributes to an exceptional capacitance.

Furthermore, CV and GCD profiles have been determined for supercapacitors prepared in Example 3a with different thickness of the polyelectrolyte. The tests revealed that the performance of the supercapacitor is not remarkably affected by the electrolyte film thickness when comparing ranges of between 2 mm and 6 mm (FIGS. 14(a) and 14(b)).

The invention claimed is:

1. A method for preparing a polyelectrolyte by reacting an effective amount of each of the following compounds in the presence of a polymerization initiator to link said compounds:
    a compound a) being a vinyl hybrid silica nanoparticle (VSNP); and
    a compound b) containing the following structural unit of Formula (I) or a structural unit derived therefrom:

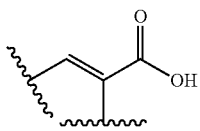

Formula (I)

said method comprises steps of:
a) providing an aqueous dispersion of the compound a);
b) adding both, the compound b) and the polymerization initiator, to the dispersion obtained in step a) and stirring at a temperature of less than 10° C.;
c) performing the polymerization at a temperature above 20° C.

2. The method of claim 1, wherein compound b) is an acrylic acid monomer having the Formula (II):

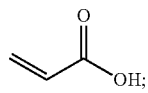

Formula (II)

and wherein compound b) has an average diameter of less than 10 nm and the polymerization initiator is ammonium persulfate, and wherein the content of compound a) relative to the content of compound b) is between 0.1 wt.-% and 0.5 wt.-%.

3. The method of claim 1, which method further comprises a step d) of soaking the polymer from step c) in phosphoric acid, wherein said phosphoric acid has a concentration of up to 70 wt.-%.

4. The method of claim 1, further comprising a step of adding water to the polymer obtained in step c) such that the water content in the polyelectrolyte is at least 100 wt.-% relative to the weight of compound b).

5. The method of claim 1, further comprising the step of preparing compound a) from vinyl-triethoxysilane in de-ionized water by stirring for at least 10 h at a temperature between 18° C. and 28° C., and wherein the temperature in step b) is about 0° C. to 4° C., and wherein the temperature in step c) is at least 30° C. and at most 45° C. and wherein step c) is carried out for at least 24 h.

6. The method of claim 1, wherein no external crosslinking agent is added.

* * * * *